United States Patent
Young

(10) Patent No.: US 9,019,537 B2
(45) Date of Patent: Apr. 28, 2015

(54) SYSTEMS AND METHODS FOR PROVIDING STATUS MONITOR CAPABILITY TO PRINTING DEVICES

(71) Applicant: Canon Kabushiki Kaisha, Tokyo (JP)

(72) Inventor: Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/747,377

(22) Filed: Jan. 22, 2013

(65) Prior Publication Data

US 2014/0204403 A1 Jul. 24, 2014

(51) Int. Cl.
*G06F 3/12* (2006.01)

(52) U.S. Cl.
CPC .................................. *G06F 3/1293* (2013.01)

(58) Field of Classification Search
None
See application file for complete search history.

(56) References Cited

U.S. PATENT DOCUMENTS

| | | | |
|---|---|---|---|
| 6,012,083 A | 1/2000 | Savitzky et al. | |
| 6,219,151 B1 * | 4/2001 | Manglapus et al. | 358/1.15 |
| 6,369,909 B1 | 4/2002 | Shima | |
| 6,829,060 B2 | 12/2004 | Simpson et al. | |
| 6,859,197 B2 | 2/2005 | Klein et al. | |
| 6,931,447 B1 | 8/2005 | Hemstreet et al. | |
| 6,940,615 B1 | 9/2005 | Shima | |
| 7,072,064 B2 | 7/2006 | Simpson et al. | |
| 7,106,465 B1 | 9/2006 | Simpson et al. | |
| 7,158,247 B2 | 1/2007 | Simpson et al. | |
| 7,177,043 B2 | 2/2007 | Qiao | |
| 7,256,909 B2 * | 8/2007 | Gomi | 358/1.18 |
| 7,496,654 B2 | 2/2009 | Corbin et al. | |
| 7,636,584 B2 | 12/2009 | Anderson et al. | |
| 7,707,325 B2 | 4/2010 | Kawasaki | |
| 7,809,787 B2 | 10/2010 | Nishio | |
| 8,068,247 B2 | 11/2011 | Wu | |
| 8,446,609 B2 * | 5/2013 | Moriwaki | 358/1.14 |
| 8,675,218 B2 * | 3/2014 | Yamada | 358/1.14 |
| 2002/0135799 A1 | 9/2002 | Simpson et al. | |
| 2003/0005110 A1 | 1/2003 | Corbin et al. | |
| 2003/0030843 A1 | 2/2003 | Qiao | |
| 2004/0167974 A1 | 8/2004 | Bunn et al. | |
| 2005/0086282 A1 | 4/2005 | Anderson et al. | |
| 2006/0197971 A1 * | 9/2006 | Simpson et al. | 358/1.14 |
| 2008/0306902 A1 | 12/2008 | Gava et al. | |
| 2011/0235085 A1 | 9/2011 | Jazayeri et al. | |
| 2011/0299110 A1 | 12/2011 | Jazayeri et al. | |
| 2012/0057193 A1 | 3/2012 | Jazayeri et al. | |
| 2013/0003106 A1 * | 1/2013 | Nishida et al. | 358/1.14 |

* cited by examiner

*Primary Examiner* — Paul F Payer
(74) *Attorney, Agent, or Firm* — Canon U.S.A., Inc. IP Division

(57) ABSTRACT

Methods and systems are described for providing status monitor capability to a networked printer. The methods and systems, upon receipt of a print job, embed status monitor instructions in print data of the print job, send the print data from an information server to the printer while monitoring the status of the printer, and return status monitor information regarding the printer.

19 Claims, 32 Drawing Sheets

| Code | String | Remarks |
|---|---|---|
| 1000 | Paper out | This code also applies to a paper jam that has occurred during paper feeding. |
| 1001 | No CD-R tray | - |
| 1002 | No disc media | - |
| 1003 | Paper out in a cassette | - |
| 1004 | Paper out in a photo deck | - |
| ... | ... | ... |
| 1020 | Media inserted in a wrong orientation | - |
| ... | ... | ... |

FIG. 7

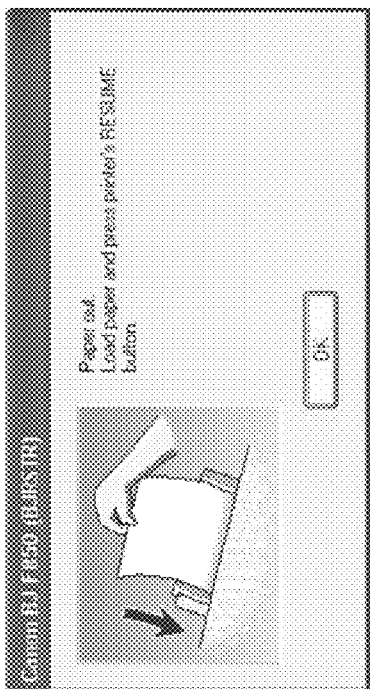
FIG. 33A
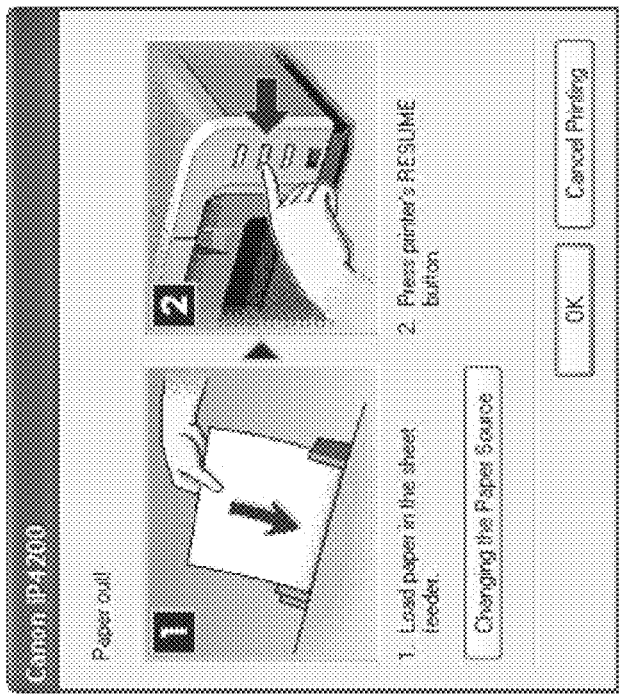
FIG. 33B
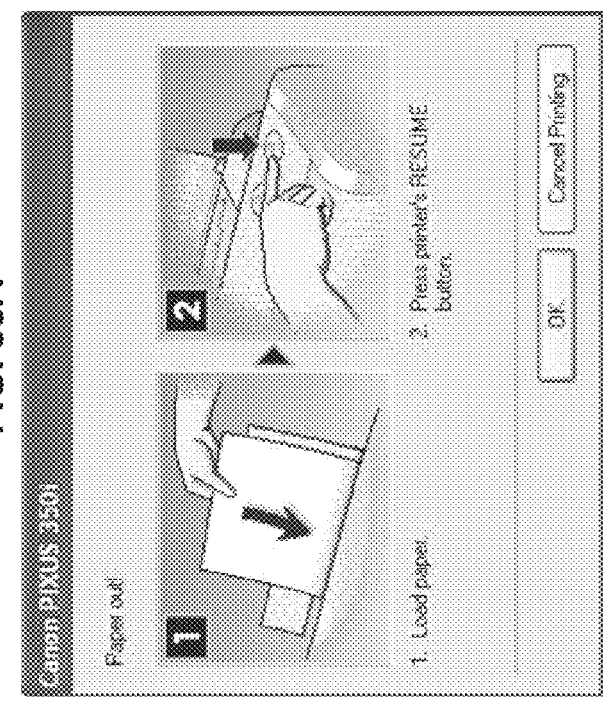
FIG. 33C
FIG. 33D

SYSTEMS AND METHODS FOR PROVIDING STATUS MONITOR CAPABILITY TO PRINTING DEVICES

BACKGROUND

1. Field

The present disclosure relates to systems and methods for providing status monitor capability to printing devices.

2. Background

Printers having network capability may fall into two categories with respect to a distributed printing service (for example a cloud printing service). Some printing devices are capable of connecting and communicating with a distributed printing service directly, are capable of self-registration with a distributed printing service, and/or may receive print jobs directly from the distributed printing service. Other printing devices require an intermediary to perform such functions, for example a computing device, such as a thin-client and/or a proxy, that operates a driver for the printing device and that mediates communication between the printing device and the distributed printing service. The former printing devices may be termed "cloud-aware" printers, whereas the latter may be termed "legacy" printers.

Distributed printing may be device independent and therefore not require any specific printer drivers. The "cloud-aware" printer may connect to the distributed printing service directly and consume print data sent from the print server of the distributed printing service, while the "legacy" printer may require connection to an intermediary on which a proxy has been installed to communicate with the distributed printing service and to pass the print data from the print server of the distributed printing service to the "legacy" printer.

However, regardless of whether the printer is directly or indirectly connected to the distributed printing service, due to the inherent and intentional limitations of state-of-the-art distributed printing services, distributed printing services do not know the status of the printer, and intervention during printing or correction of printer errors is therefore not possible.

SUMMARY

In one embodiment, a method of providing status monitor capability to a networked printer is described, including, upon receipt of a print job, embedding status monitor instructions in print data of the print job, sending the print data from an information server to the printer while monitoring the status of the printer, and returning status monitor information regarding the printer for processing.

In another embodiment, a printing system is provided. The printing system includes an application configured to initiate a printing request, a print server configured to embed status monitor instructions in print data of a print job corresponding to the printing request to create combined print data, and a printer configured to receive the combined print data from the print server, decipher the combined print data, extract the status monitor instructions from the combined print data, and process the print data.

In yet another embodiment, a printing method includes initiating a print job request, processing the print job, combining print data by embedding status monitor instructions in print data of the print job, and sending the combined print data to a target printer, extracting the status monitor instructions from the combined print data, sending the print data to the target printer, in accordance with the status monitor instructions, querying the printer status of the target printer, forwarding the printer status to a print server, receiving and interpreting the printer status, and displaying the printer status to a user.

In another embodiment, a system for providing status monitor capability to a networked printer is described. The system includes an application configured to request a print job, an information server configured to communicate with the application to receive the print job request, and a printer configured to communicate with the information server. The information server embeds status monitor instructions in print data of the print job, and sends the print data with embedded status monitor instructions to the printer, and the embedded status monitor instructions enable return of status monitor information to the application.

In another embodiment, a non-transitory computer readable medium is provided that stores instructions that, when executed by one or more computing devices, cause the one or more computing devices to perform operations including initiating a print job request, embedding status monitor instructions in print data of the print job, and sending the print data with embedded status monitor instructions to a proxy, extracting the status monitor instructions from the print data, sending the print data to a printer, querying the printer status of the printer in accordance with the status monitor instructions, relaying the printer status, receiving and interpreting the printer status, and displaying the printer status to a user.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 7 is an example error code to error string mapping table.

FIGS. 33A-D are example paper out error dialog boxes.

DETAILED DESCRIPTION

Figure 1:
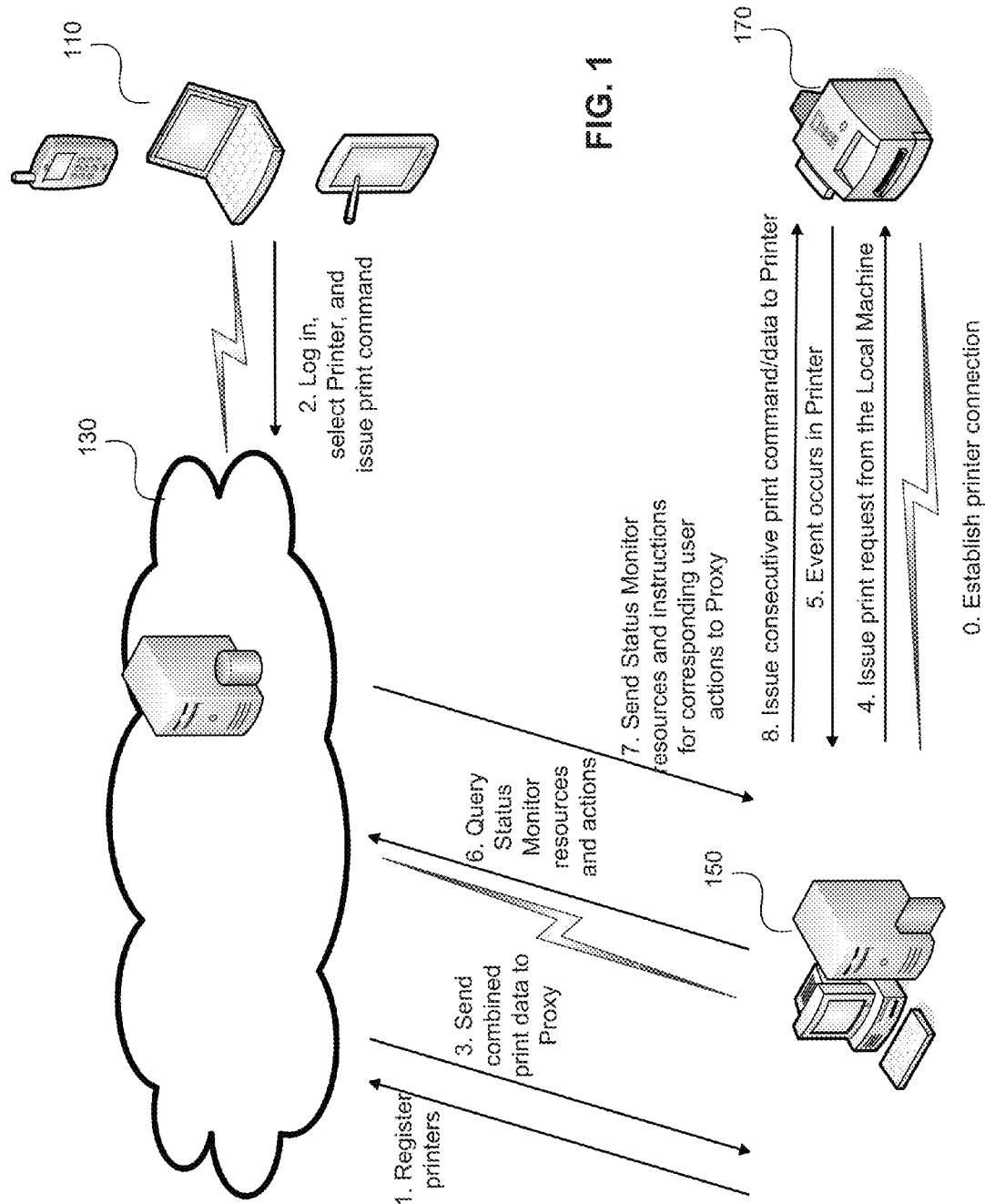
FIG. 1 is a flow diagram for cloud printing using a "legacy" printer.

The following description is of certain explanatory or illustrative embodiments, and the disclosure is not limited to these embodiments, but includes alternatives, equivalents, and modifications such as are included within the scope of the claims. Additionally, the illustrative embodiments may include several novel features, and a particular feature may not be essential to practice the systems and methods described herein.

Whether they are web, computer, or mobile-based, most printing applications interacting with distributed printing services utilize the Internet, aiming to make printing from a compatible application similar to printing from traditional desktop applications running on desktop operating systems (OS). However, with the proliferation of web-connected (mobile) devices and operating systems, it is not feasible to build and maintain complex print subsystems and print drivers for each platform. Thus, distributed printing services are directed towards enabling applications on any device to print to a wired or wirelessly connected printer without creating and maintaining printing subsystems for all the hardware combinations of client devices and printers and without requiring users to install drivers to the client. This leads to loss of functionality. Typical distributed printing services (whether used directly or connected via an intermediary) do not have any knowledge of the connected printer because they do not have either a printing subsystem or printer driver that was provided by the printer vendor. The print requesting application or intermediary is unable to retrieve and to understand the printer status, and the user is unable to intervene during printing (for example, to cancel a print job) or to correct any print error (for example, if the printer paper is out, the printer is out of ink, the printer cover is open, etc.).

In existing systems, if a mobile or non-proximal user submits a print job to a printer having distributed printing capabilities, the print job is sent to the printer connected to the distributed network. If, during the course of printing an error occurs or an issue arises, such as ink becomes depleted, paper runs out, that affects the printing, the printer stops and waits for the user's intervention to continue, However, no warning is passed to the thin-client if the printer is a non-cloud aware printer, and at best the user may eventually find out through the distributed printing server that there was a "Printer Error" or "An error occurred." Such generic statements do little to help resolve the issue or error and thus the printing is unable to resume.

In contrast, the print requesting application or intermediary of the instant application is able to determine, aided by the status monitor instructions, retrieval and understanding of the printer status. The user may intervene during printing (for example, to cancel a print job) or to correct any print error (for example, if the printer paper is out, the printer is out of ink, the printer cover is open, etc.).

Figure 52:
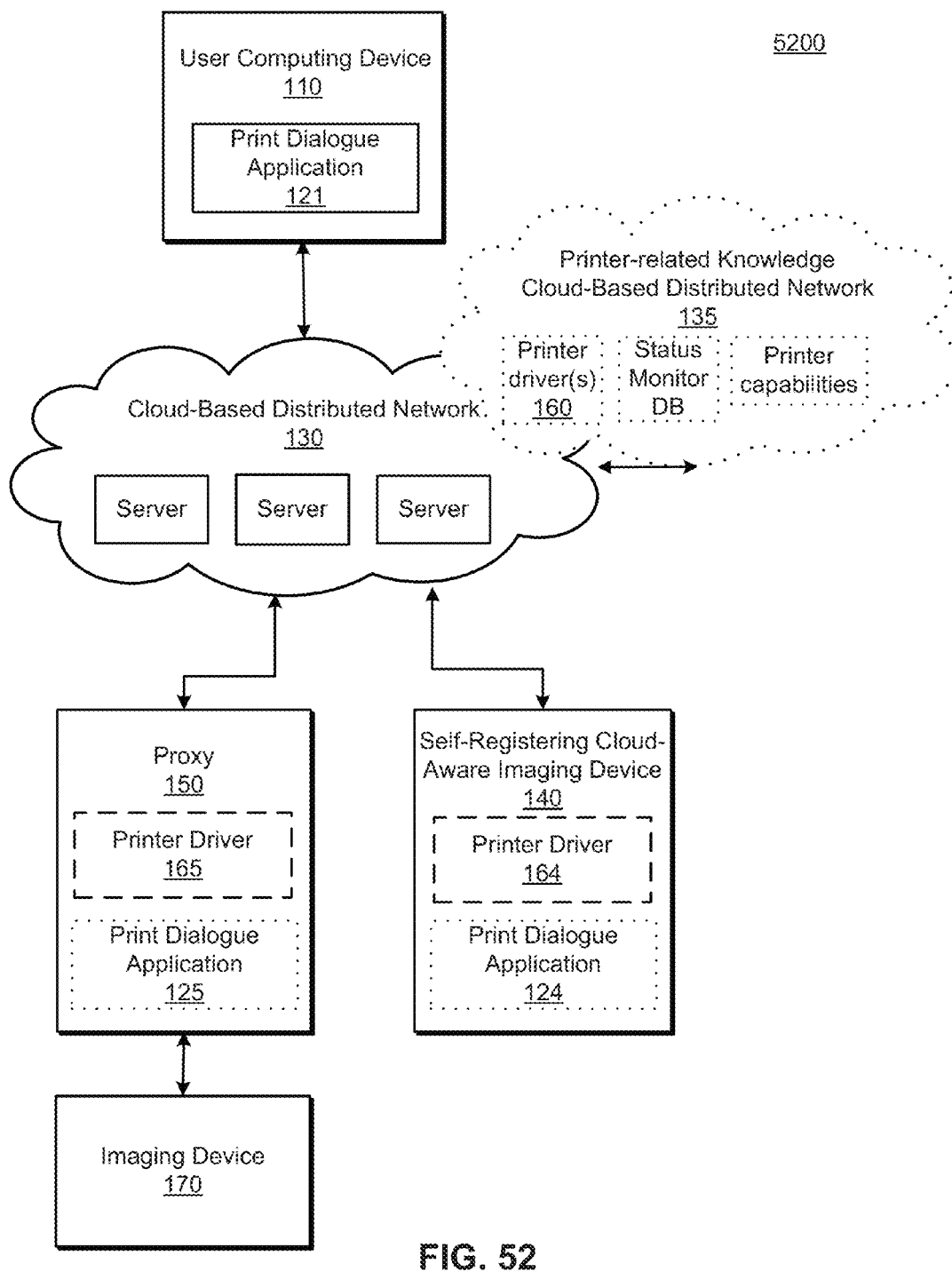
FIG. 52 is a block diagram illustrating a system for determining or monitoring status of printing devices.

FIG. 52 is a block diagram illustrating an embodiment of a printing system 5200. The printing system 5200 includes a user computing device 110, a cloud-based distributed network 130, and to effect printing, either or both of a self-registering cloud-aware imaging device 140 and a proxy 150 connected to an imaging device 170. The entities in the printing system 5400 may communicate via wired or wireless channels.

The user computing device 110 may be a mobile device, such as a mobile phone, a personal digital assistant (PDA), or a tablet, which is capable of communicating via a network and/or may include at least one display that is capable of rendering images. In other embodiments, another computing device (such as a desktop, laptop computer, server, etc.) may be used as the user computing device 110. The user computing device 110 includes one or more processors (also referred to herein as "CPUs"), which may be a conventional or customized microprocessor(s). The CPUs are configured to read and execute computer-readable instructions, and the CPUs may command and/or control other components of the user computing device 110.

The user computing device 110 also includes I/O interfaces and/or I/O devices. The I/O interfaces provide communication interfaces to I/O devices, and the I/O devices may include a keyboard, a display device, a mouse, a printing device, a touch screen, a light pen, an optical storage device, a scanner, a microphone, a camera, etc. The user computing device 110 also includes memory, which may be volatile or non-volatile, such as ROM, RAM, and flash memory. The user computing device 110 further includes a network interface that allows the user computing device 110 to communicate with the other devices (e.g., the cloud-based distributed network 130). The user computing device 110 also includes a storage device that is configured to store data or modules and may include, for example, a hard drive, an optical storage device, a diskette, and a solid state drive. The user computing device 110 includes an operating system, which manages the hardware, the processes, the interrupts, the memory, and/or the file system of the user computing device 110.

The user computing device 110 further includes a print dialogue application 121. The print dialogue application 121 generates a user interface that presents information to a user and/or receives information from the user via the user computing device 110. The user interface may present the information in the form of a graphical interface that shows printer settings and capabilities and that receives user selections, such as selections of one or more options for a respective setting. The information may also be presented in any other manner that allows the user to view the information and/or select one or more options. Further, the print dialogue application 121 may be any application that prints data, such as a document processing application or a web browser.

Information may be presented to a user via a display on any of the user computing device 110, proxy 150, imaging device 170 and self-registering cloud-aware imaging device 140, including information sent by the imaging device 170 and self-registering cloud-aware imaging device 140. This may be accomplished through the print dialogue application 121, and optional print dialogue applications 125 and 124, on the proxy 150 and self-registering cloud-aware imaging device 140, respectively. The proxy 150 may receive user provided information (e.g., user selections of print settings) and relay the information to the imaging device 170.

The self-registering cloud-aware imaging device 140 and the imaging device 170 are both configured to receive data and print images (e.g., text, graphics, photographs) on one or more print media (e.g., paper, cardboard, plastic) based on the received data. Additionally, the self-registering cloud-aware imaging device 140 and the imaging device 170 may print the images onto the print media according to one or more user adjustable settings. Furthermore, the self-registering cloud-aware imaging device 140 does not require an intermediary device (e.g., a proxy) to communicate with the cloud-based distributed network 130. That is, the self-registering cloud-aware imaging device 140 communicates directly with the cloud-aware distributed network 130. The self-registering cloud-aware imaging device 140, which may also include a printer driver 164, is configured to communicate via a network and automatically register itself with the cloud-based distributed network 130, for example upon initial activation or in response to a user command (e.g., a button activation). In contrast, the imaging device 170 requires an intermediary device, such as the proxy 150, to communicate with the cloud-based distributed network 130. That is, the imaging device 170 communicates indirectly with the cloud-based distributed network 130 via the proxy 150.

The cloud-based distributed network 130 includes one or more servers that may store and/or provide data and/or other information. For example, the servers in the cloud-based distributed network 130 may be cloud printing service servers or independent hardware vendor (IHV) servers. In some embodiments, information particular to printer-related knowledge may be stored and/or provided from a specific printer-related knowledge cloud-based distributed network 135, which may include, for example, printer driver(s) 160, a status monitor database and printer capabilities.

The proxy 150 is a computing device that interfaces between one or more entities and one or more other entities in a network. Particularly in the disclosed embodiments, the proxy 150 is configured to relay data between the cloud-based distributed network 130 and the imaging device 170 and/or relay data between the cloud-based distributed network 130 and a printer driver 165 (which may have been received from the cloud-based distributed network 130 or downloaded from the printer-related knowledge cloud-based distributed network 135). When relaying data, the proxy 150 may change the format of the data (e.g., the protocol, the language). In addition, the proxy 150 may invoke the functionality of the printer driver 165 via an option, may send data to the printer driver 165 in the form of parameters of the option, and may receive the data (if any) returned by the option. Furthermore, in one embodiment the proxy 150 includes the printer driver 165.

The printer driver 165 is configured to receive data, perform requested operations, and return requested data (e.g., to the proxy 150). Moreover, the printer driver 165 is configured to communicate with the imaging device 170 regarding the settings, capabilities, and status of the imaging device 170 (e.g., paper level, ink level, toner level, paper size, colors).

Settings include, but are not limited to, media size, borderless printing, duplexing, media type, resolution, colors, orientation, copying, collating, media quality, print quality, and margins. An option defines a configuration for a setting (e.g., gray scale is an option for color, letter size is an option for media size, landscape is an option for orientation), and a set of some or all of the available options for a setting are the capabilities of the respective setting (e.g., portrait and landscape may be the capabilities for orientation).

When the print dialogue application 121 is opened, the print dialogue application 121 communicates with at least one server in the cloud-based distributed network 130 to retrieve and display imaging device information (e.g., settings and capabilities). Then a user may select necessary print settings to fulfill his/her printing intent. In some embodiments, a print dialogue application 125 may also be available on the proxy 150 or a print dialogue application 124 may also be available on the self-registering cloud-based imaging device 140. Further details are described hereinafter.

Figure 53:
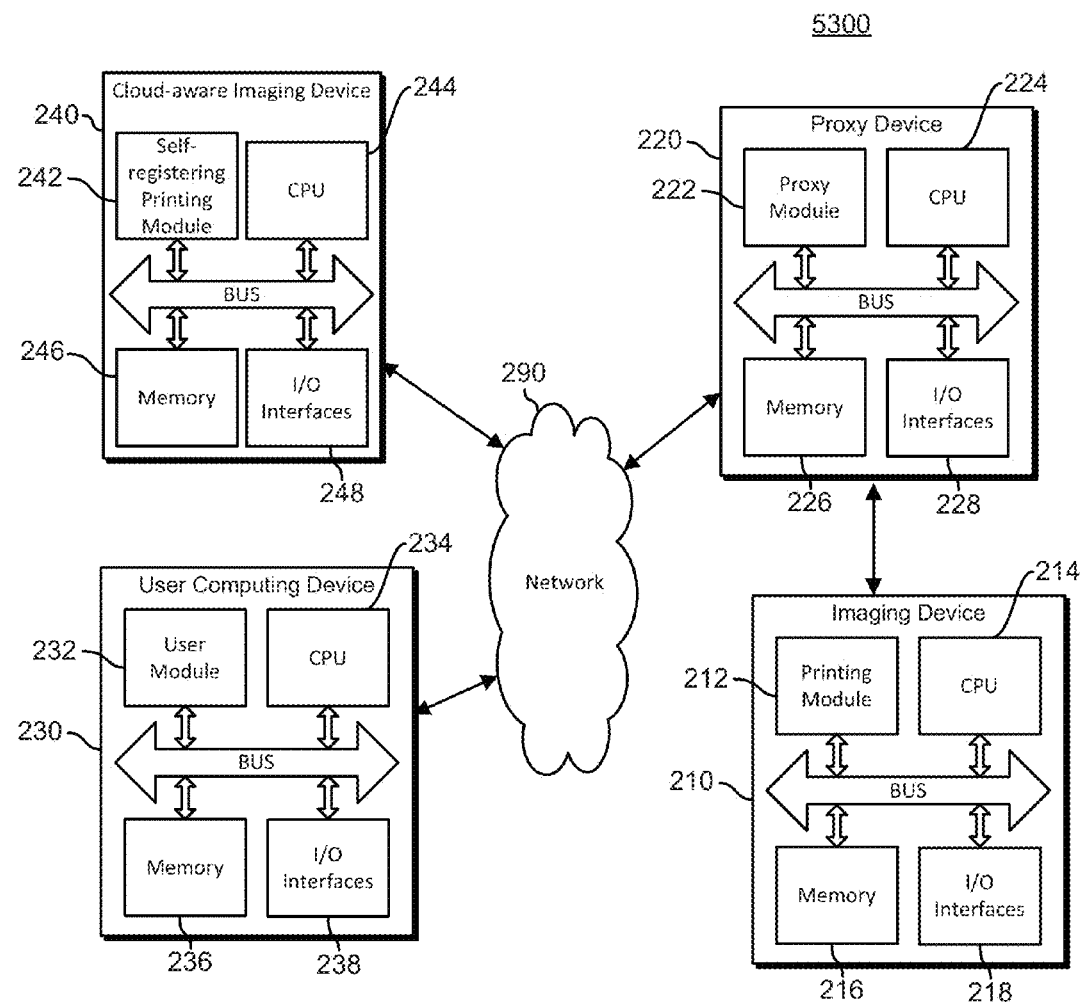
FIG. 53 is a block diagram that illustrates an example embodiment of a system for providing status monitor capabilities to a distributed printing network of printing device(s).

FIG. 53 is a block diagram that illustrates an example embodiment of a system 5300 for providing status monitor capability to a printing device. The system includes an imaging device 210 connected to a proxy device 220, a user computing device 230, and a cloud-aware imaging device 240.

The imaging device 210, the proxy device 220, the cloud-aware imaging device 240 and the user computing device 230 each respectively include one or more computing devices. Computing devices include, for example, desktops, laptops, servers, mainframes, personal digital assistants, tablet computers, cellular phones (including smart phones), etc. The computing devices may communicate via one or more networks 290, and the one or more networks 290 include one or more of a LAN, a WAN, a personal network, the Internet, a wired network, and a wireless network. One or more of the cloud-aware imaging device 240, the user computing device 230, the imaging device 210 (through the proxy device 220), and the proxy device 220, may operate in a distributed or cloud computing environment, where computing, software, platforms, or infrastructure may be provided as a service. Therefore, the imaging device 210, the proxy device 220, the cloud-aware imaging device 240, and the user computing device 230 may be physically located miles apart.

The user computing device 230 includes a CPU 234, memory 236, I/O interfaces 238, and a user module 232. The CPU 234 includes one or more computer processors, such as single core or multi-core central processing units and/or micro-processing units. The CPU 234 may be incorporated in a stand-alone apparatus or in a multi-component apparatus. The CPU 234 may implement computer-executable instructions and/or control the implementation of computer-executable instructions by other members of a connected device. A memory 236 includes one or more computer-readable media, and thus is configured to store computer-readable data and/or computer-executable instructions.

The memory 236 may include, for example, one or more of a magnetic disk (e.g., a flexible disk (floppy disk), a hard disk, redundant array of independent disks (RAID)), an optical disc (e.g., CD, DVD, Blu-ray), a magneto-optical disk, a micro-drive, a read-only memory (ROM), solid state memory (e.g., random access memory (RAM), DRAM, SRAM, flash memory, video RAM (VRAM), a nonvolatile memory card, a solid state drive), erasable programmable read only memory (EPROM), electrically erasable programmable read only memory (EEPROM), a magnetic tape or card, and an optical card.

The user computing device 230 also includes one or more I/O interfaces 238. The I/O interfaces 238 provide communication interfaces to input and output devices, which may include a keyboard, a display device, a mouse, one or more controls (e.g., buttons, switches, dials), a touch screen, a scanner, a microphone, a drive, and a network (either wired or wireless).

The user module 232 (which may implement a mobile application, e.g., a mobile "app") sends printing requests to printing devices, receives information regarding the printing devices and otherwise enables user communication regarding requested print jobs. A module includes instructions that may be executed by a computing device to cause the computing device to perform certain operations, though for purposes of description a module may be described as performing the operations. Modules may include logic, computer-readable data, and/or computer-executable instructions and may be implemented in software (e.g., Assembly, C, C++, C#, Java, BASIC, Perl, Visual Basic), firmware, and/or hardware. Other embodiments may include additional or less modules, combine modules into fewer modules, or divide the modules into more modules. Depending on the embodiment, one or more of the user module 232 and the other modules shown in FIG. 55 (the printing module 212, the proxy module 222, and the self-registering printing module 242) may be executed by one or more computing devices to implement part or all of the methods described herein.

The imaging device 210 includes a CPU 214, a memory 216, I/O interfaces 218, and a printing module 212. The printing module 212 operates a printing service that allows users to send print jobs to printing devices via one or more networks 290. The printing module 212 directs print jobs to printing devices, converts the respective formats of print jobs, communicates with an account manager associated with the printing service 210, and/or manages users and printing devices (including cloud-based printing device 240).

The proxy device 220 includes a CPU 224, memory 226, I/O interfaces 228, and a proxy module 222. The proxy module 222 manages connected imaging/printing devices (e.g., legacy imaging device 210) that are available for use by members of the network 290 through the proxy device 220. The proxy module 222 may associate owners with printing devices, maintain data that indicates which printing devices a particular user is allowed to access, associate proxy IDs with respective printing user IDs, validate users, associate printing user IDs with respective proxy IDs, communicate with the sharing service 200, and/or track the printing devices that a user has been invited to use by the sharing service 200.

The cloud-aware imaging device 240 includes a CPU 244, memory 246, I/O interfaces 248, and a self-registering printing module 242. The self-registering printing module 242 self-registers the cloud-aware imaging device 240, receives print jobs, and/or other information. The cloud-aware imaging device 240 also includes software and hardware for printing.

Following is provided example descriptions of methods and systems of embedding status monitor instructions in print data. The print data is sent from or through, for example, a cloud-based server to a thin-client or proxy and the target printer is connected to the thin-client or proxy through wired or wireless means. The instant subject matter allows the user to monitor the printer status, irrespective of proximity to the target printer, and to handle various printer situations that would otherwise affect printing. In several embodiments, dialog and/or warning boxes are displayed on the thin-client, user computing device or other display for resolution of the problem so that the user can decide to continue or cancel the print job.

By embedding status monitor instructions to the print data sent from a distributed network printing server the distributed printing proxy on the thin-client is instructed to get the coded printer status from the port (i.e. USB port or Wi-Fi port) based on the status monitor instruction embedded in the data stream and then send the status to the distributed printing network server for interpretation. The distributed printing network server will match the coded printer status to a meaningful status string to the thin-client for the proxy to display on the screen and to prompt the user for action. When a user chooses the action to act on the printer situation, the proxy will send the selection to the distributed printing network server which will then find and send the appropriate printer command to the thin-client to pass to the connected printer for execution.

In one embodiment, a web application initiates a printing request. The distributed printing network server then renders the print job, embeds the status monitor instructions (in consideration of the target printer) to the print data, and then sends the combined print data to the target printer connected to the thin-client. Some examples of possible status monitor instructions include: show a message after sending the data up to this point; wait for a user's confirmation (for example clicking of an "OK" button, thereby effecting a pause of sending data to the device); read data from the device periodically while printing and send the data back to the distributed network; read data from the device after the data up to this point is sent to the device; etc. Other examples of possible status monitor instructions, which require a higher degree of coordination between a distributed network server and a thin-client or proxy include: wait for user's selection and send it back to the distributed network; read data from the device after the data up to this point is sent to the device and wait for instruction from the distributed network or other source; etc.

The thin-client or proxy deciphers the print data before bypassing it to the printer and getting the status monitor instructions from the print data. The proxy sends the print data to the printer. In most instances, the status monitor instructions may be removed from the print data at this point. During printing, the proxy will follow the status monitor instructions to query the printer status from the appropriate port and forward it to the distributed network printing server.

The distributed network printing server receives the printer status (which is coded) from the proxy and checks with the database of the target printer to decipher whether the status is an error or a warning. If an error or a warning (such as paper out, out of ink, paper jam, etc.) is deciphered, or an error or warning condition is in effect, the distributed network printing server will find the appropriate error or warning string and possible options for resolution and send the string and resolution options back to the proxy device.

The proxy will in turn display the error or warning to the thin-client display or other appropriate display and prompt the user for options based on the message sent from the distributed network printing server concerning the displayed error or warning. Upon seeing the error or warning or related messages, a user may choose to acknowledge the situation and/or choose an option to resolve the situation. The proxy will send the responsive selection to the distributed network printing server.

Upon receiving the responsive selection, the distributed network printing server matches and finds the corresponding print command from the database for the target printer. The distributed network printing server then sends the Cloud Print server sends the appropriate print command to the proxy.

The proxy will then pass the print command to the target printer to resolve the warning or error. If, for example, the user instead chooses to cancel the print job to resolve the warning or error, the distributed network printing server will remove the print job from server's print queue, and the proxy will send a Soft Reset to the printer to stop printing and eject the current printing paper.

FIG. 1 illustrates an example distributed network print flow diagram, using an imaging device 170 that requires connection through a thin-client proxy 150 to access a distributed network 130 having one or more servers. Print commands may be provided from any or a plurality of user computing devices 110. As an initial action, a connection is established between the imaging device 170 and the thin-client/proxy 150. In a further example action, the thin-client registers the printers or imaging devices connected thereto to the distributed network. After registration, a user may log in to a distributed network or network printing application through a user computing device 110, select the printer it desires as a print target, and issue a print command. The command is received through the network and relayed in the form of combined print data (print data and embedded status monitor instructions) to the proxy. The proxy issues a print command or request from the local machine, to the target printer 170, and printing occurs, so that or until the print-related event occurs in the printer. In some embodiments, the proxy is able to receive the event from one of its ports because the original status monitor instructions asked it to poll the port every four seconds (the interval may be pre-set, varied or fixed).

Upon receiving notification of a print-related event, the proxy sends the event code to the distributed network 130, for example in the form of a query to a status monitor database or other knowledge database, to determine available resources and further action. In some instances, the response may be automatic or may be prompted by a user interfacing the distributed network directly or indirectly through the user computing device(s) 110. For example, the user computing device 110 may provide the distributed network 130 with the appropriate instructions, or an instruction associated with the status monitor query may be automatically generated by the distributed network 130 and sent with status monitor resources and instructions for corresponding user actions to the proxy 150. In other examples, the proxy may display a status monitor dialog and wait for instructive actions. Depending on the instructive actions, corresponding instructions may be executed in subsequent actions by one or more system units. After receipt of the resources and instructions, the proxy is in turn enabled to issue consecutive print commands or data to the printer for continued or resumption of the print job.

Figure 2:
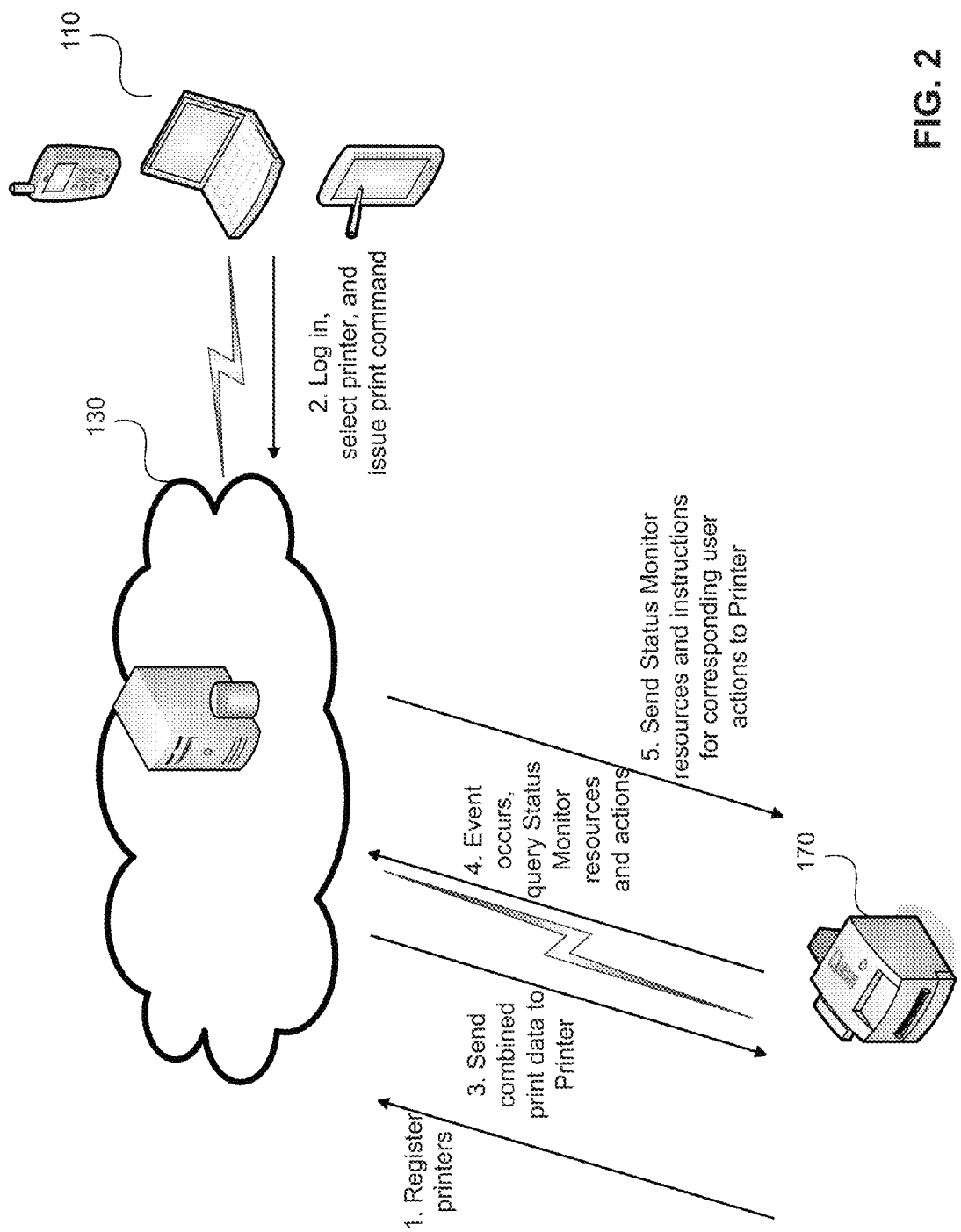
FIG. 2 is a flow diagram for cloud printing using a "cloud-aware" printer.

FIG. 2 depicts another embodiment, in which a cloud-aware device 140 is networked with a distributed network 130 having a server, and accessible by one or more user computing devices 110. The cloud-aware device 140 is capable of executing self-registration and connection to the distributed network 130 and does not require an intermediate thin-client or proxy device. Thus, if a user computing device 110 logs in to a distributed network or distributed network printing application, selects the cloud-aware device 140 and issues a print command thereto, combined print data (comprising print data and status monitor instructions) is sent directly to the cloud-aware printer 140. Upon the occasion of the cloud-aware device 140 having a related event, the device 140 directly queries the distributed network 130 (and one or more of its associated servers) for status monitor resources and actions. Similarly, the status monitor resources and instructions for corresponding user actions are sent directly to the printer device 140. The device 140 may display a status monitor dialog and wait for user's action. Alternatively, a status monitor dialog may be displayed only on the user computing device 110, or duplicated on the user computing device 110. Depending on a user's action, the corresponding instruction received in line 5 may be executed at the device 140.

The system(s) and embodiments may comprise further and additional units. For example, one or more firewalls or network security features may be incorporated without impact to the status monitor functionality. In such a scenario, imaging or printing devices are registered, nonetheless. In one possible legacy printer configuration, after an application or mobile user sends a print job, a cloud print server may notify the proxy that there is a job waiting for the printer and the proxy will then retrieve the print data and route it to the legacy printer. With the Status Monitor logic or code embedded in the print data, when the proxy receives the print data it will extract the Status Monitor logic from the print data and execute the logic during printing. In some instances, it is possible and may be desirable for the print server to switch to handling other tasks after the print server sends the print data to the proxy. In other instances, it may be desired to have the Status Monitor logic remain in the cloud print server, in which case there will be continuing traffic between the proxy and the server during printing that will hold the server from doing other tasks. Such a design may require more complicated and sophisticated protocol creation so as to properly route printer or print job status from the proxy to the server, and to route command or other action(s) from the server to the proxy.

A more detailed example of distributed network printing will be described in relation to the flow diagram of FIGS. 3A and 3B.

Figure 3A:
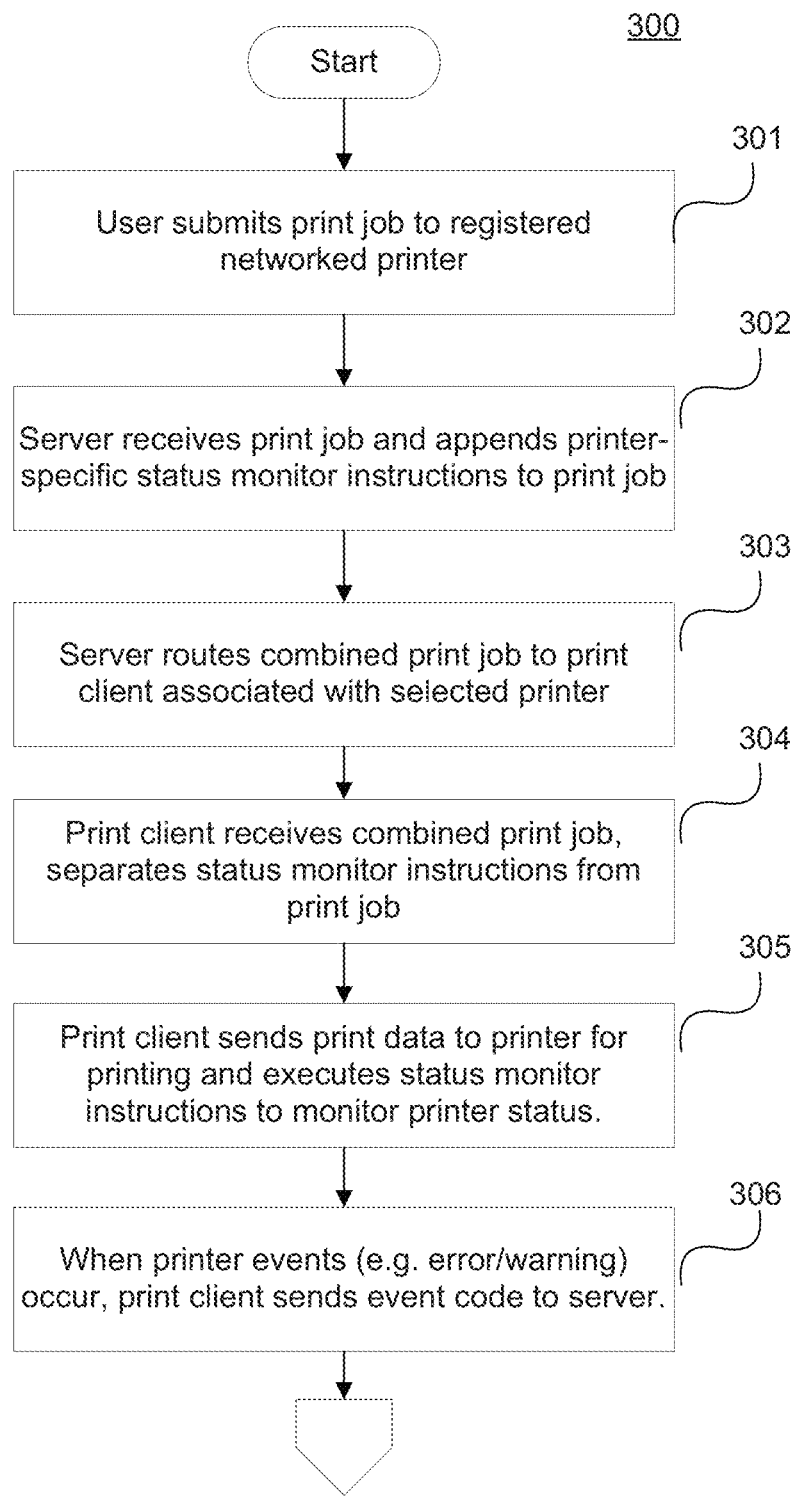
FIGS. 3A and 3B together comprise a flow diagram for example steps of distributed network printing.

In block 301 of FIG. 3A, the user submits a print job to the registered networked printer. Then in block 302, a server receives the print job and appends the printer-specific status monitor instructions to the print job. Next, in block 303 the server routes the combined print job to the print client associated with the selected printer. The print client receives the combined print job, separates the status monitor instructions from the print job data (block 304) and sends the print data to the printer for printing. The print client also executes the status monitor instructions to monitor the printer status (block 305). If and when printer events (such as error(s) or warning(s)) occur, as in block 306, the print client sends the event code to the server.

Figure 3B:
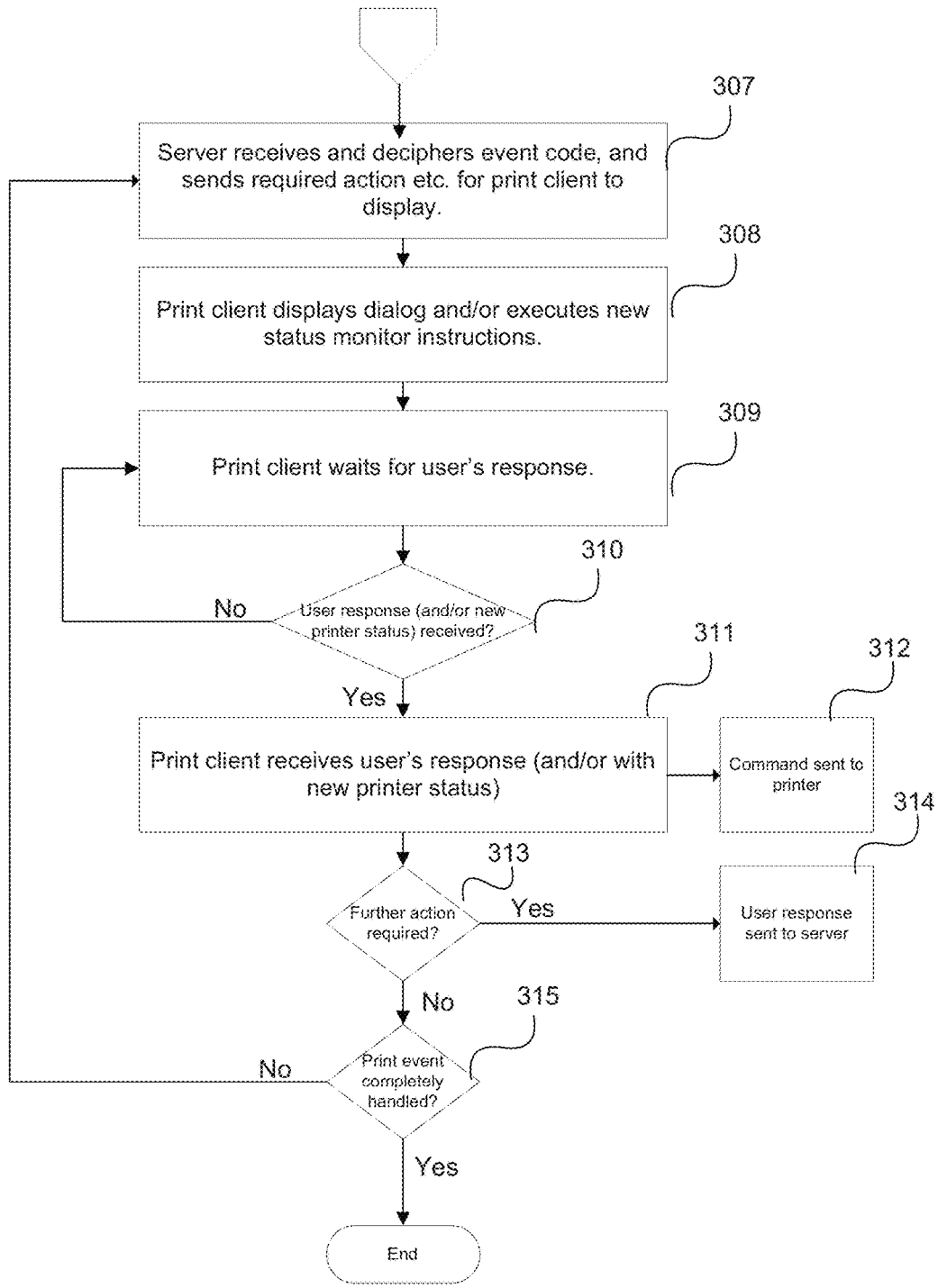

As shown in FIG. 3B, the flow continues in block 307 with the server receiving and deciphering the event code, and sending the required action (including dialog type, dialog messages, dialog icons, further status monitor instructions etc.) for the print client to display. The print client displays a dialog and/or executes new status monitor instructions in block 308, before waiting for the user's response in block 309. In some instances, it may be more appropriate for the dialog to be displayed on the user computing device instead of or in addition to on the print client, proxy or printer. This may also depend on the location of the print client, proximity and sophistication of the user and ability of any user to access the imaging device. The determination of whether a user response (and/or new printer status) has been received (block 310) leads to two outcomes: If no response or status is received, the print client continues to wait for a response. If yes, the print client receives the user's response (and/or with new printer status), as in block 311, and sends the command to the printer (block 312). At block 313, a further determination is made of whether further action is required; if action is required, the user response is sent to the server, as seen in block 314. If no further action is required, and the determination of whether the print event has been completely handled as in block 315 is affirmative, the process ends. If the print event has not been completely handled, the process returns to block 307.

FIGS. 4A-4E are flow diagrams corresponding to portions of the example systems in the vein of the systems shown in FIGS. 1 and 2.

Figure 4A:
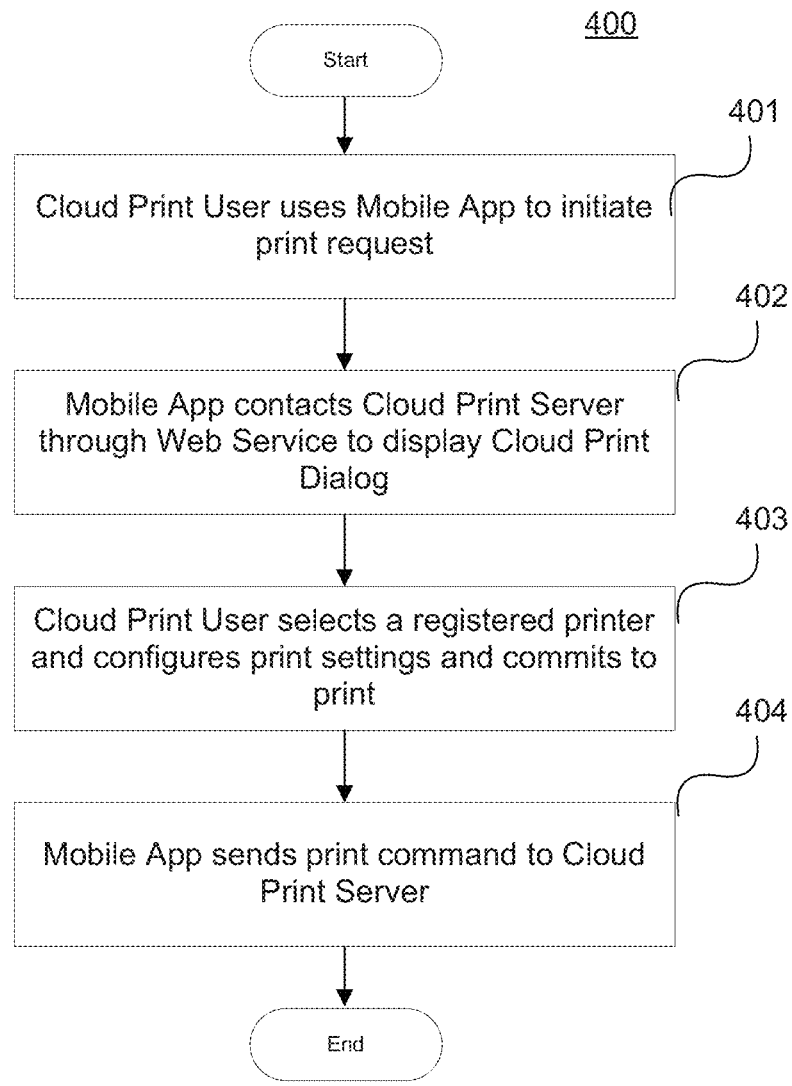
FIGS. 4A-4E are flow diagrams of example embodiments corresponding to portions of the flow diagrams of FIGS. 1 and 2.

FIG. 4A outlines an example flow 400 for a user of a distributed printing network system to commit to printing, as seen for example in line 2 of FIGS. 1 and 2. Flow starts in block 401, in which a user, which may in some configurations be referred to as a "Cloud Print User", may use a mobile application "Mobile App" or other application on a user computing device 110 to initiate a print request. Next in block 402, the application contacts the distributed printing network, which may in some configurations be called a "Cloud Print Server" through a network application, which may in some configurations be called a "Web Service" to display a user interface or dialogue, which may in some configurations be called a "Cloud Print Dialog". In block 403 the Cloud Print User selects a registered printer and configures the print settings according to the desired output document(s) and commits to print. The mobile application or other printing application sends in block 404 the print command to the Cloud Print Server.

Figure 4B:
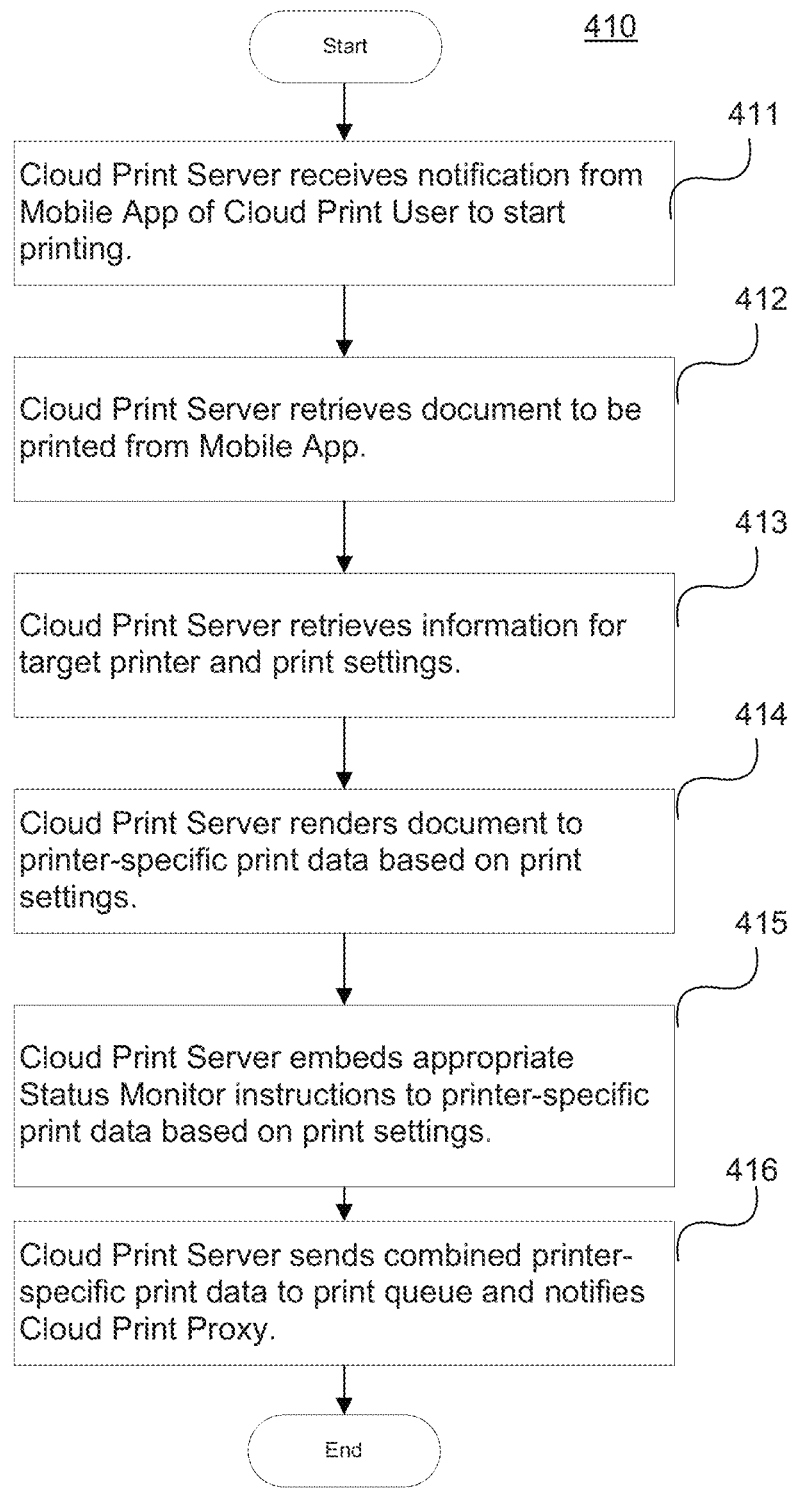

FIG. 4B outlines an example flow 410 for a server of a distributed printing network system to send print data to a thin-client or proxy device, as seen for example in line 3 of FIG. 1. Using similar terminology as in FIG. 4A, in block 411, the Cloud Print Server receives notification from an application or "Mobile App" employed by a user, such as a Cloud Print User to start printing. Next, in block 412 the Cloud Print Server retrieves the document to be printed from the Mobile App and in block 413 the Cloud Print Server retrieves relevant information for the target printer and print settings. In block 414 the Cloud Print Server renders the document to the printer-specific print data based on the print settings. Then in block 415 the Cloud Print Server embeds the appropriate status monitor instructions into the printer-specific print data based on the desired print settings and the selected target printer. Lastly in block 416 the Cloud Print Server sends the combined printer-specific print data to the print queue of the target printer and notifies the thin-client or proxy device, which may be called a "Cloud Print Proxy".

Figure 4C:
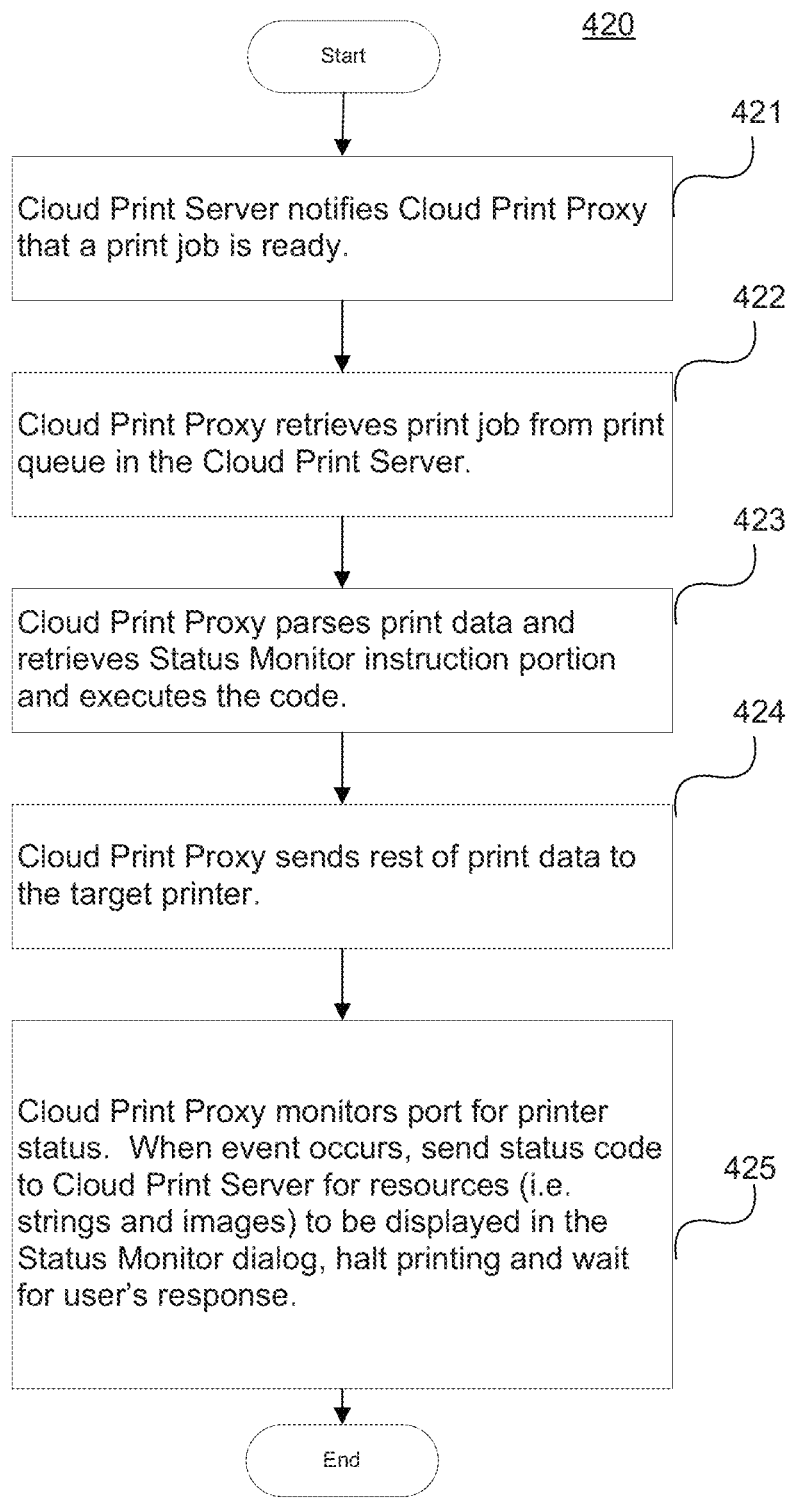

FIG. 4C outlines flow elements 420 for a thin-client or proxy of a distributed printing network system to communicate with a connected printer. This may correspond to lines 4 and 5 of FIG. 1. As seen in block 421, a Cloud Print Server notifies a Cloud Print Proxy that a print job is ready. Then in block 422, the Cloud Print Proxy retrieves the print job from the print queue in the Cloud Print Server. In block 423 the Cloud Print Proxy parses the combined print data to separate the print data and status monitor components and retrieves the Status Monitor instruction portion and executes the code commands associated with the retrieved status monitor instruction. The Cloud Print Proxy sends the rest of the print data to the target printer in block 424. The port is monitored by the Cloud Print Proxy in block 425 for printer status. When an event occurs, the Cloud Print Proxy sends the status code to the Cloud Print Server for the resources, such as strings and images, to be displayed in the Status Monitor dialog. In the meantime, printing is halted until a response, such as from a user, is received.

Figure 4D:
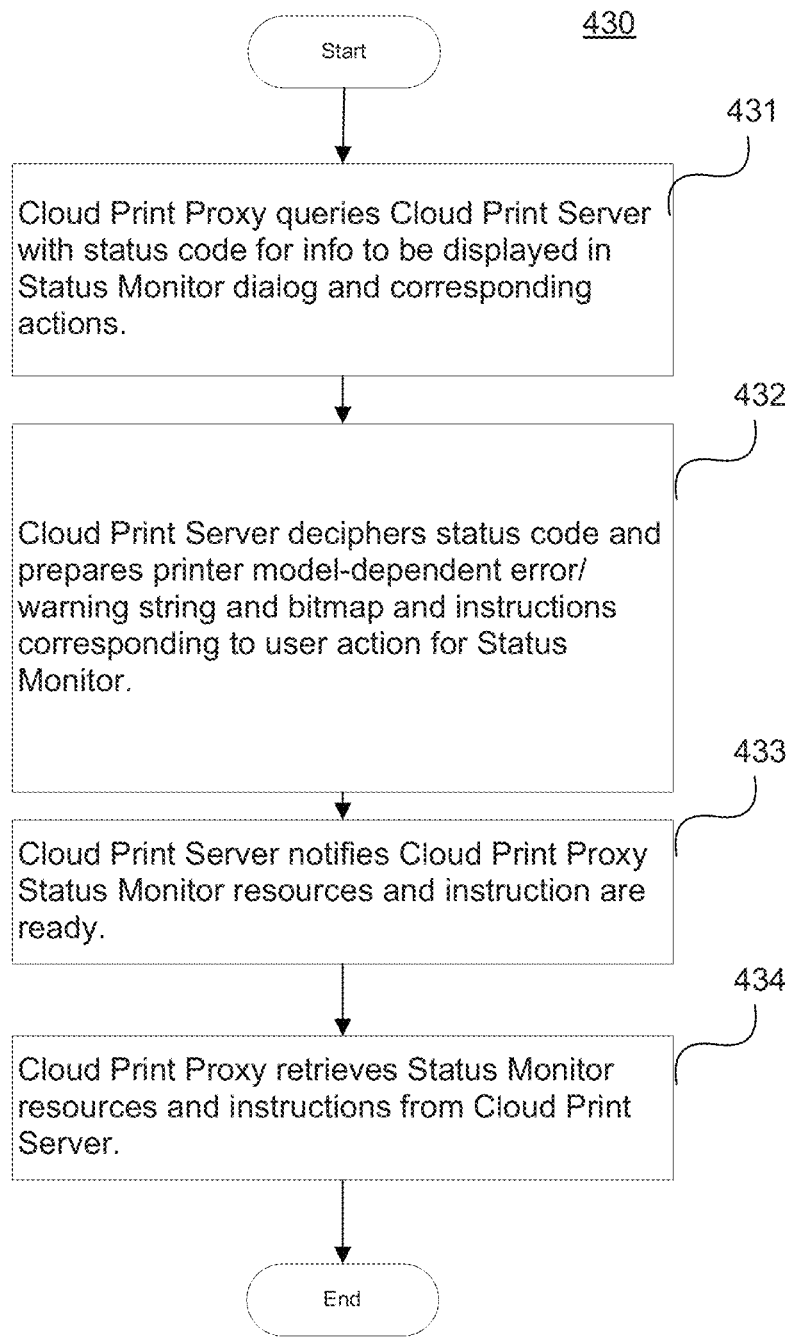

An example flow 430 of actions between a server of a distributed printing network and communicating thin-client or proxy device when a printing related event happens is shown in FIG. 4D. This may correspond to lines 6 and 7 of FIG. 1. Initially, in block 431, a Cloud Print Proxy may query a Cloud Print Server with one or more status code(s) for the information to be displayed in the Status Monitor dialog or display and the corresponding actions. As in block 432, the Cloud Print Server deciphers the provided status code(s) and prepares the printer model-dependent error and/or warning string(s) and bitmap(s) and instructions corresponding to promptable and actionable user action(s) for the Status Monitor. In block 433 the Cloud Print Server notifies the Cloud Print Proxy that the Status Monitor resources and instruction is ready, so that in block 434 the Cloud Print Proxy retrieves the Status Monitor resources and instructions from the Cloud Print Server.

Figure 4E:
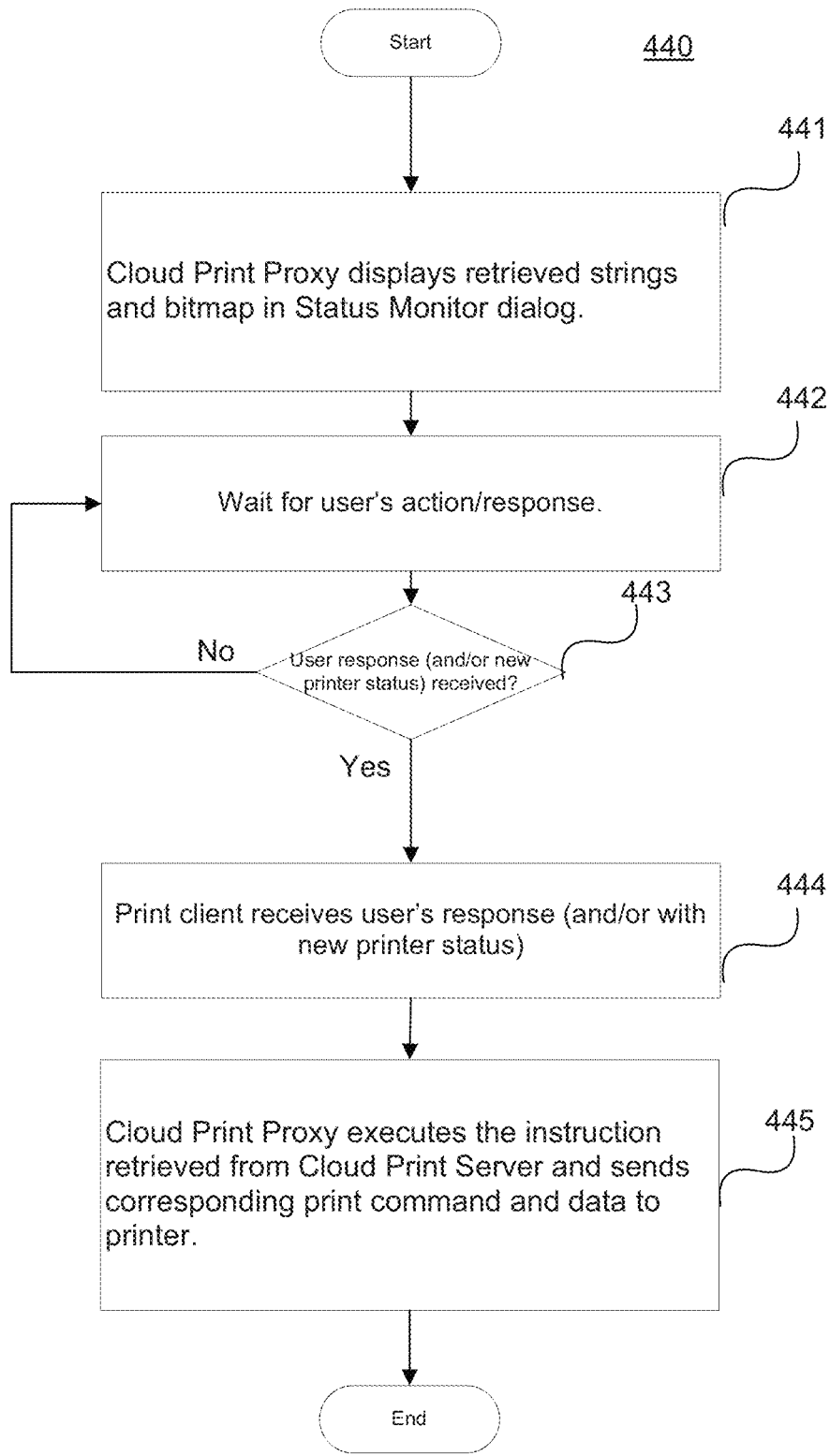

FIG. 4E shows an example that may correspond to line 8 in FIG. 1, of a thin-client or proxy device sending consecutive commands or data to a connected printer 440. A Cloud Print Proxy displays in block 441 retrieved strings and bitmap in a status monitor dialog or other display and waits for responsive user action(s) in block 442. If the determination of whether the user response (and/or new printer status) 443, is no, the flow returns to block 442 and resumes waiting. If, however, as in block 444 the print client receives the user's response with or without the new printer status in the Status Monitor, the flow continues to block 445 where the Cloud Print Proxy executes the instruction retrieved from Cloud Print Server and sends corresponding print command(s) and data to the connected printer.

Figure 5:
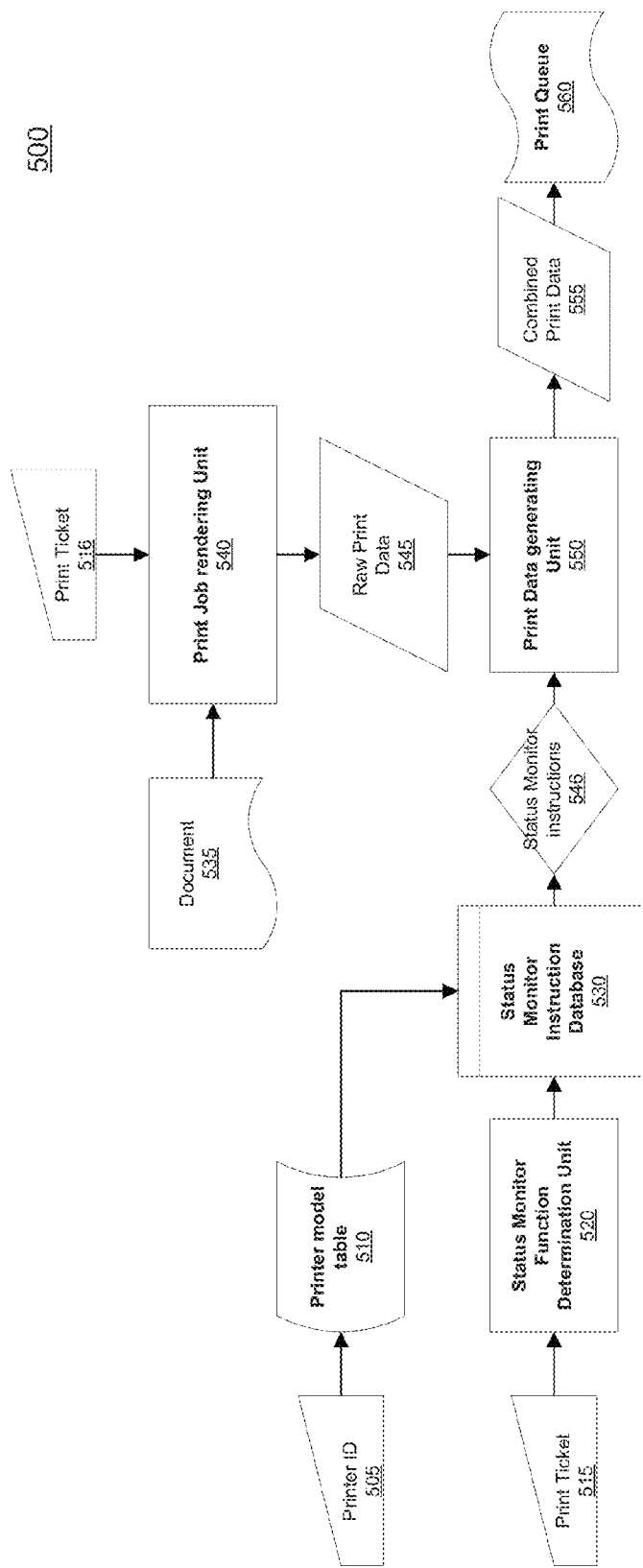
FIG. 5 is a cloud server diagram for print job generation.

FIG. 5 depicts an example distributed network printing server or cloud server diagram for print job generation. In at least one embodiment, the distributed network printing server 500 comprises a printer model table 510 and status monitor function determination unit 520, into which a printer ID 505 and print ticket 515 are fed respectively. Accordingly, the appropriate printer information and status monitor function is able to be fed from the printer model table 510 and status monitor function determination unit 520 into the status monitor instruction database 530 to output the status monitor instructions 546. With respect to the information to be printed, the document to be printed 535 is fed into the print job rendering unit 540 along with the print ticket 516 to generate raw print data 545. The raw print data 545 and status monitor instructions are combined, for example with the status monitor instructions embedded into the print data using the print data generating unit 550 to create combined print data. This in turn is passed to the print queue 560. In other embodiments the distributed network printing server may comprise one or more of a printer determination unit, printer driver information, status monitor sequences embeddable in printer data, table to convert status monitor code to user-understandable strings etc.

Figure 6:
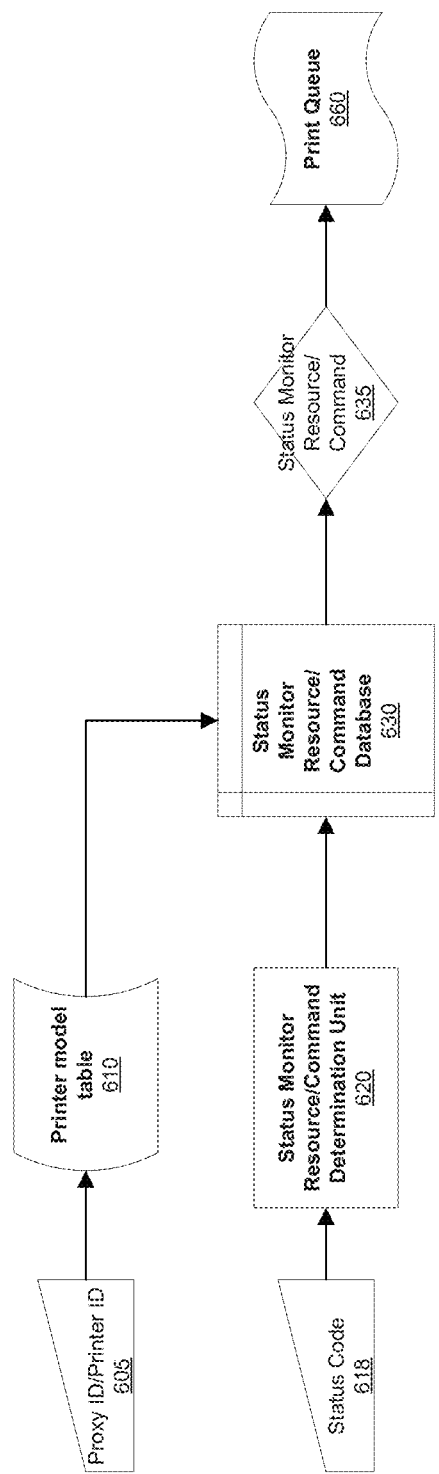
FIG. 6 is a cloud server diagram for status monitor resource/command generation.
Figure 8B:
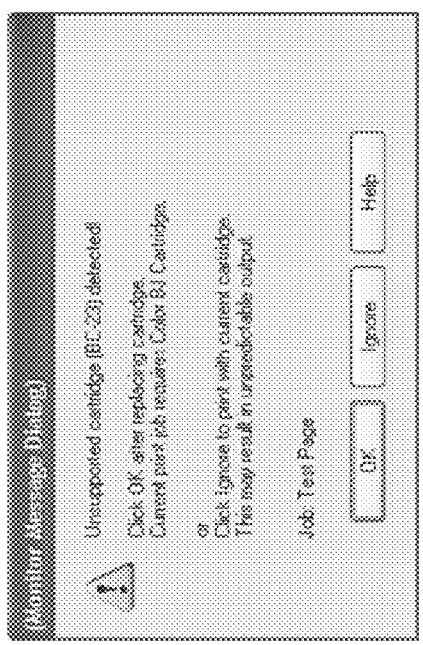
FIGS. 8A-8D are example status monitor dialog boxes regarding mismatched cartridge or print head warnings.
Figure 8D:
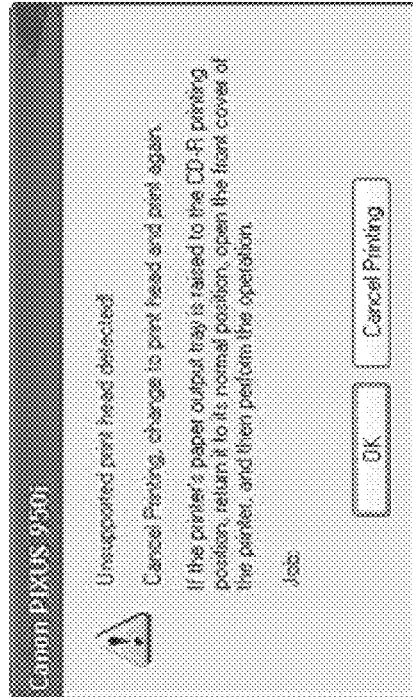
Figure 8A:
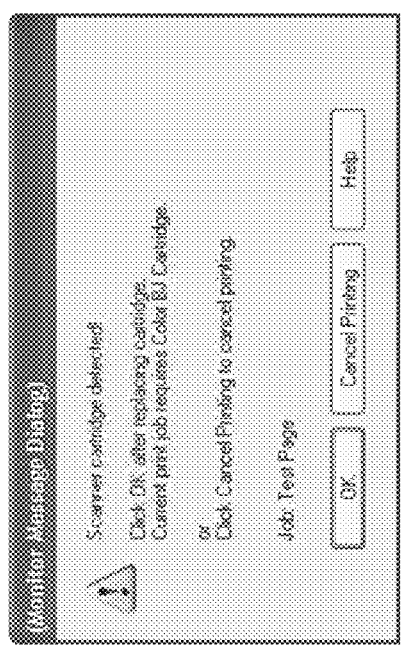
Figure 8C:
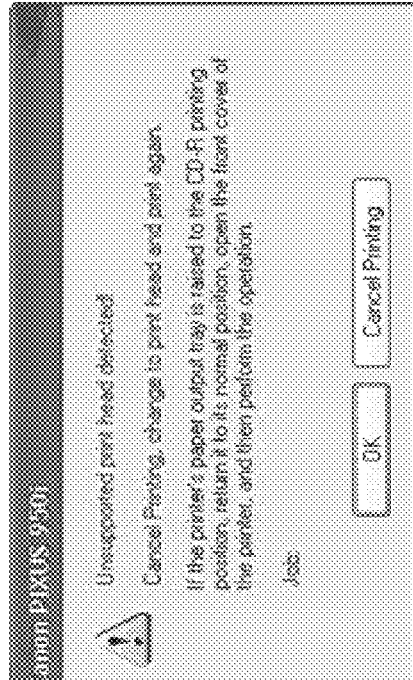

FIG. 6 depicts an example distributed network printing server or cloud server diagram for status monitor resource/command generation. A proxy ID and/or printer ID 605 is fed to a printer model table 610 while a status code 618 returned from the connected printer is fed into a status monitor/command determination unit 620. Accordingly, the appropriate printer and status information is provided to the status monitor resource/command database 630 so that the appropriate status monitor resource or command 635 is provided to the print queue 660.

Examples of codes and corresponding strings retrievable from, for example status monitor instruction database 530 or status monitor resource or command database 630 are provided in FIG. 7, an example error code to error string mapping table. Status monitor resource/command generation may be made through referencing such a table. For example, the error code 1000 could correspond to the string "Paper-out" or when a paper jam has occurred during paper feeding, while codes 1003 and 1004 could correspond to the strings "Paper-out in a cassette" and "Paper-out in a photo deck," respectively. Codes 1001 and 1002 could correspond to the strings "No CD-R tray" and "No disk media," respectively. Code 1020 could correspond to media inserted in a wrong orientation. These are a few of the error codes and corresponding strings that could be stored in an appropriate database.

While some of the embodiments discussed above include a thin-client or proxy device, a system comprising a cloud-aware or self-registering printing or imaging device would be able to perform similar functions as that described with respect to a thin-client or proxy and (legacy) printer configuration. A cloud-aware device would be able to receive combined print data from the print server, decipher the data and extract the status monitor instructions, rendering only the printing part, execute the status monitor instruction, and send the status to the server. In this aspect the cloud-aware printer does not necessarily need the server to map the coded info to detailed printer error or warning string and dialog or graphical user interface, because the cloud-aware printer has the knowledge already. Thus the cloud-aware printer could directly display or prompt display of an appropriate dialog and process the user input, etc. to continue the printing request.

Thus, the instant subject matter enables the thin-client or other user computing device to receive an error or warning in dialog, graphical interface or other descriptive form when an affected print condition happens, and allows for resolution of the print condition. Thus a Status Monitor is enabled for many types of imaging devices, regardless of the original capabilities of the imaging system and network capabilities. Status monitor instructions are embedded in print data sent from a distributed network printing server to a receptive client, and printer status retrieved based on the embedded status monitor instructions and sent to the distributed network printing server for matching, deciphering and display of resolution options and printer status. This display may be made to any of the connected devices and any selected or subsequent commands sent to the appropriate printing, imaging or other device for action and resolution of the initially requested print job. Optionally, a resolution print command may be displayed.

The embedded status monitor may be presented in a format that is considered 'harmless' to the target printer, such that the printer may ignore the command sequence if it does not understand, need or is unable of processing the sequence. For example, if the status monitor instructions cannot be embedded in print data, under some circumstances a printer may be allowed to ignore status monitor instructions. Since the distributed network printing server determines what kind of status monitor instructions to embed in print data based on the printer ID (see for example 505 in FIG. 5, in some instances the printer model or a previously determined coded PrinterID) and print settings in a print ticket (see for example item 515 in FIG. 5, in some instances a previously determined coded PrintTicket). If no special status monitor requirement is needed, the server will embed the least minimum instruction, which may be, for example, the status monitor instruction to check the printer every four seconds.

Alternatively, it may be preferred to set the system to handle exceptions by not embedding any status monitor instruction(s) at all. For example, a Cloud Print Proxy could be programmed to either strip the status monitor instructions out of the print data and only send the raw print data to the connected printer or to send the combined print data as is to printer. In the latter case, in most cases, the printer can ignore the status monitor portion and only handle the raw print data.

An example status monitor instruction sequence for manual duplex printing could be as follows:
<STM: read status data every 4 seconds>
>
RAW-Data-2 (raw data for even pages)
<STM: XXXX> command will be ignored even if they are sent to the device.
]

An example status monitor instruction sequence for paper thickness adjustment could be as follows such that when a user selects thick paper for printing, the paper thickness checking status monitor instructions would be embedded in the print data:
<STM: read status data every 4 seconds>
<STM: send command to check the current Thickness Select Lever position>
<STM: check if Lever setting is correct>
<STM: If not, show message "The paper thickness lever is not set in the recommended position">
<STM: wait for confirmation>
RAW-Data The dialog or graphical user interface shown in FIG. 13B could be displayed as needed as a result of such status monitor instructions.

For a printer capable of detecting media types (having a media type detector), media type checking instructions could be embedded in the print data:

```
<STM: read status data every 4 seconds>
<STM: send command to check the current Media Type
   installed>
<STM: check if Media Type matched>
<STM: If not, show message "The paper type could not be
   identified correctly">
<STM: wait for confirmation>
RAW-Data
```

Figure 15:
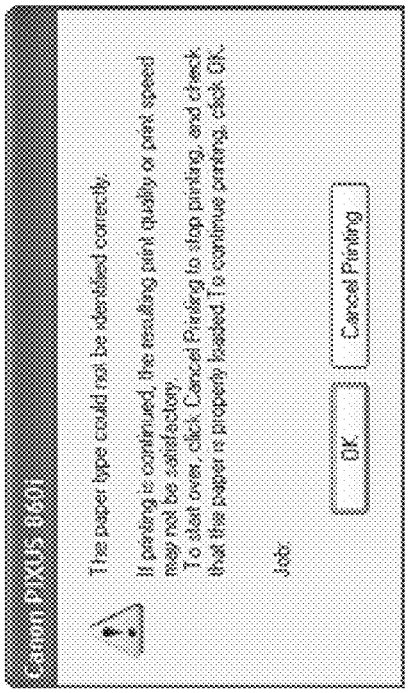
FIG. 15 is an example media type mismatch warning dialog box.

The dialog or graphical user interface shown in FIG. 15 could be displayed as needed as a result of such status monitor instructions.

For a printer capable of detecting media sizes (having a media size detector), media type checking instructions could be embedded in the print data:

```
<STM: read status data every 4 seconds>
<STM: send command to check the current Media Size
   installed>
<STM: check if Media Size matched>
<STM: If not, show message "The selected paper size and
   the paper source are not compatible">
<STM: wait for confirmation>
RAW-Data
```

Figure 18A:
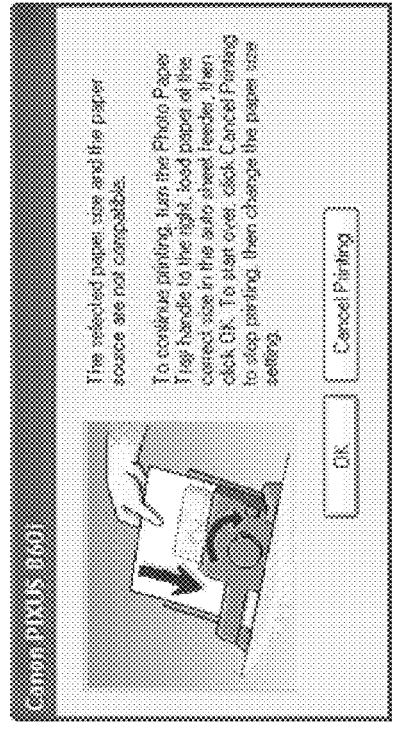
FIGS. 18A and 18B are example media size mismatch warning dialog boxes.
Figure 18B:
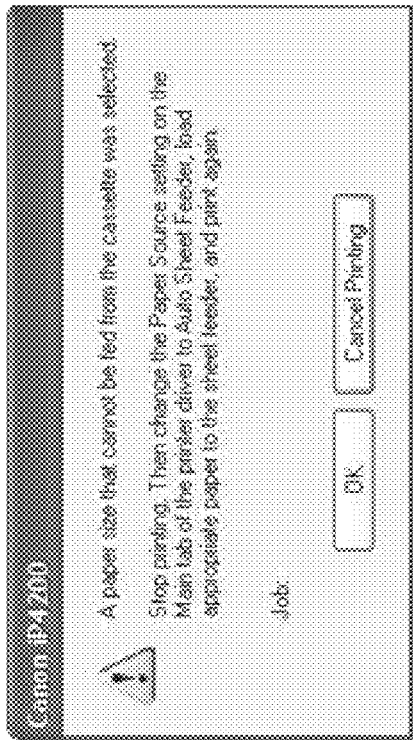

The dialog or graphical user interface shown in FIGS. 18A and 18B could be displayed as needed as a result of such status monitor instructions.

Status monitor instructions can also be used to guide a user in performing printing functions, for example using various types of media. In one example, if a user selects CD-R printing, CD-R printing instructions can be embedded in the print data:

```
<STM: read status data every 4 seconds>
<STM: show message "Starting printable disc printing">
<STM: check if CD-R tray is inserted correctly>
<STM: If not, warn the user and wait for confirmation>
RAW-Data
```

Figure 26A:
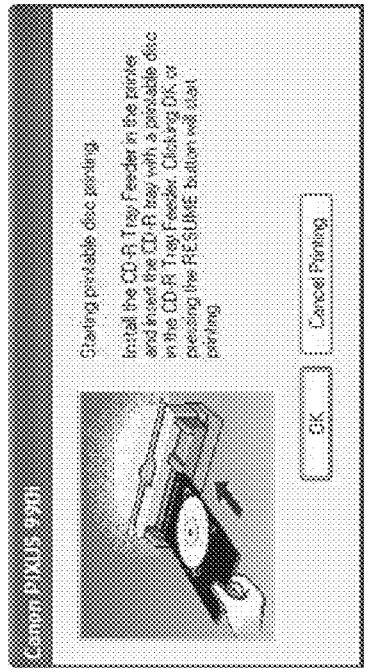
FIGS. 26A and 26B are example banner print setting guide dialog boxes.

The dialog or graphical user interface shown in FIG. 26A could be displayed as needed as a result of such status monitor instructions.

Some examples of Status Monitor dialog boxes are provided. A first type is warning dialog boxes. These include, for example, a mismatch cartridge/print head warning notifying the user that there is a mismatch between the inserted cartridge or print head and that required to perform the current print job. A print head may also not be detected or installed (due to absence or improper positioning) or an unsupported head or cartridge may be detected. The user may perform actions responsive to the dialog box's instructions, choose to ignore the message, or cancel the print job.

Dialog box(es) may also be used to confirm transitional operations, for example, replacement of needed supplies such as an ink tank. A first dialog box may note that a printer's cover was detected as having been opened, and ask the user whether a used supply has been replenished. If the user responds in the affirmative, a second dialog box may be used to confirm the (sub) type of supply replenished.

Other dialog boxes may include a cassette paper size mismatch warning, auto sheet feeder installation error, paper thickness lever adjustment, ink tank uninstallation mismatch warning, media type or size mismatch warning, unsupported media type or size warning (for example for borderless printing or duplex printing), missing or improperly installed accessory unit (for example auto duplex unit or u-turn cassette not yet installed but needed for requested printing), and special conditions needed for special print settings (for example a certain combination of media type and paper size may be needed for fine art printing, so the user is notified of the mismatch, requested to correct the settings, and informed of the issue). The dialog boxes provide more information about what triggered the warning, how to rectify the underlying issue, and next steps. After resolving the issue, the user may click "OK" to proceed with printing, or cancel printing.

Figure 9B:
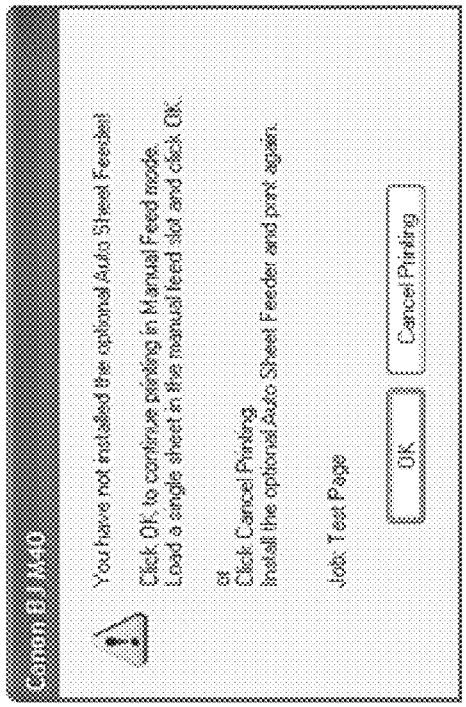
FIGS. 9A and 9B are example status monitor dialog boxes for the operation transition of ink tank replacing.
Figure 11:
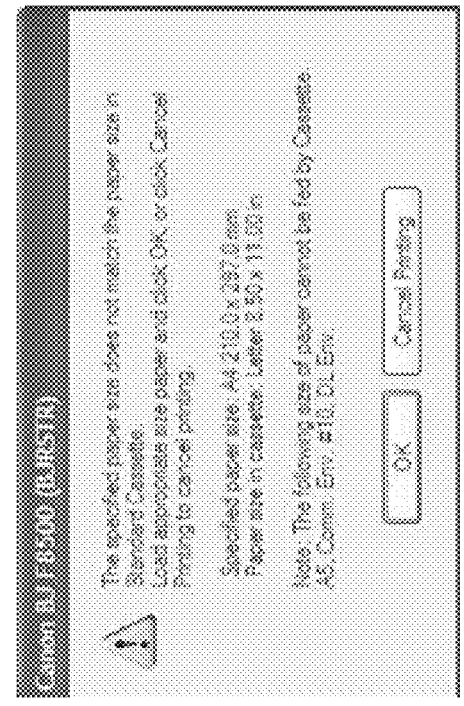
FIG. 11 is an example Auto Sheet Feeder installation error warning dialog box.
Figure 9A:
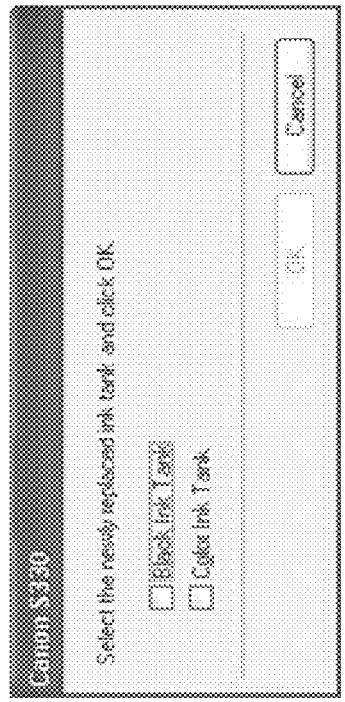
Figure 10:
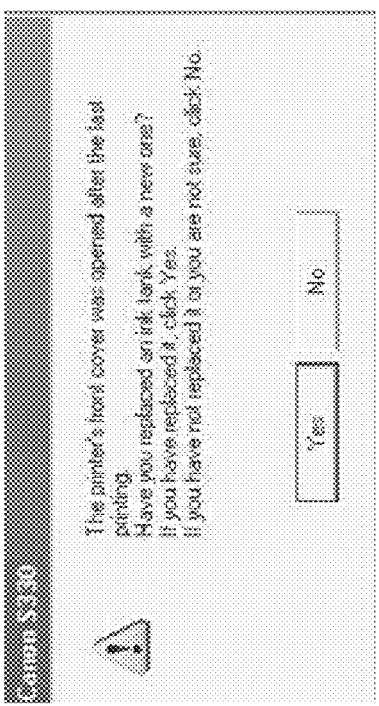
FIG. 10 is an example cassette paper size mismatch warning dialog box.
Figure 12:
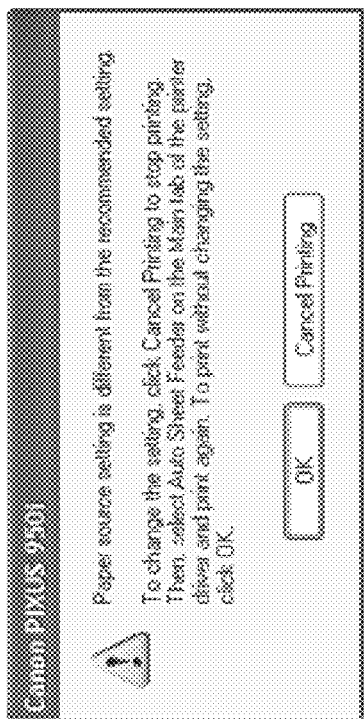
FIG. 12 is an example paper source setting warning dialog box.
Figure 13B:
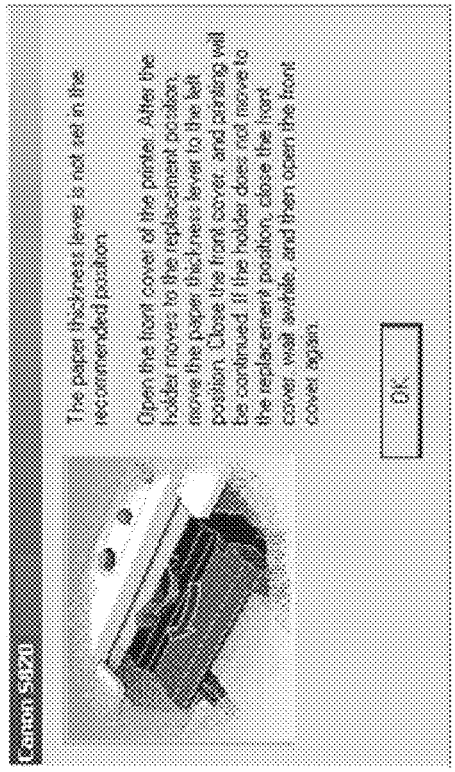
FIGS. 13A and 13B are example paper thickness lever adjustment error dialog boxes.
Figure 13A:
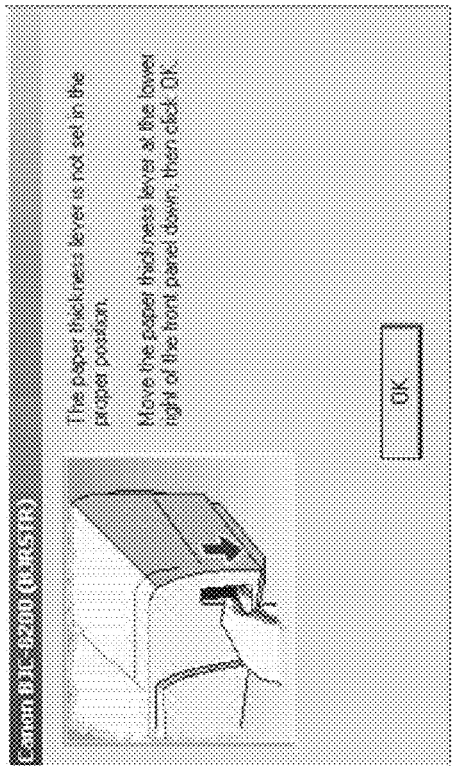
Figure 14:
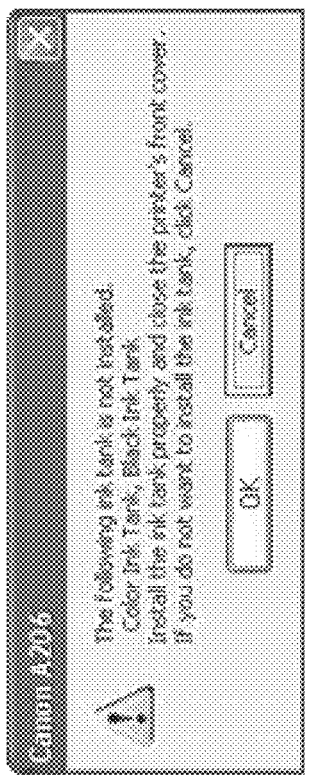
FIG. 14 is an example ink tank installation mismatch warning dialog box.
Figure 16:
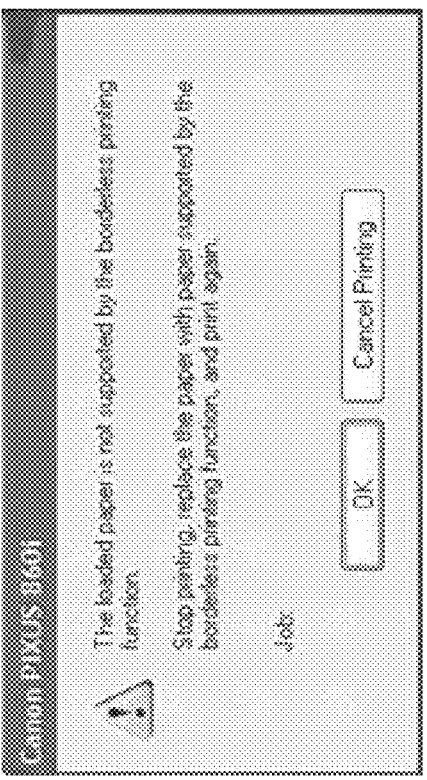
FIG. 16 is an example borderless printing unsupported media type warning dialog box.
Figure 17:
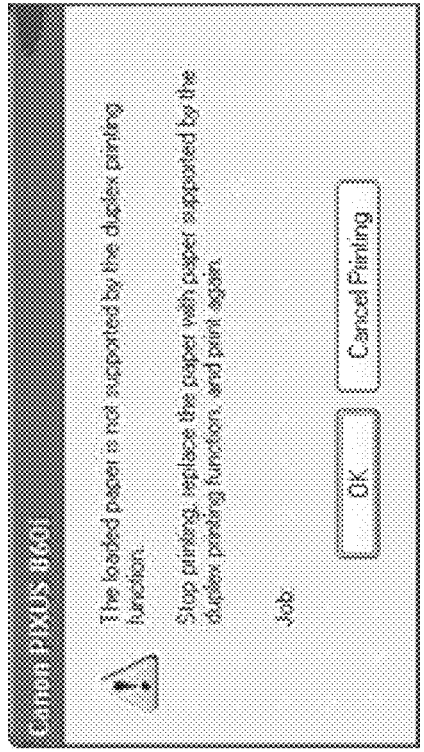
FIG. 17 is an example duplex printing unsupported media type warning dialog box.
Figure 19A:
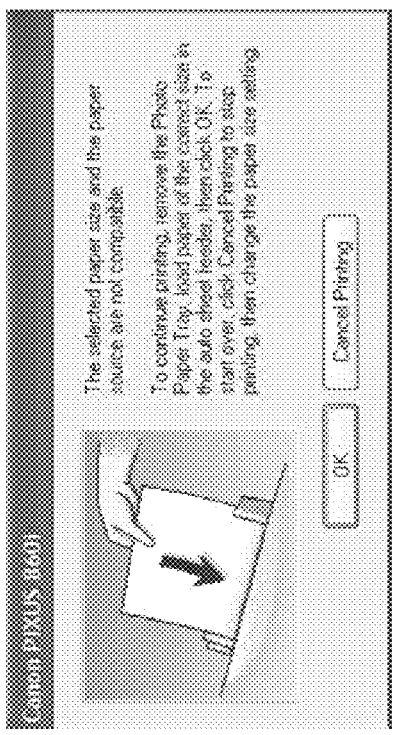
FIGS. 19A and 19B are example unsupported paper size warning dialog boxes.
Figure 19B:
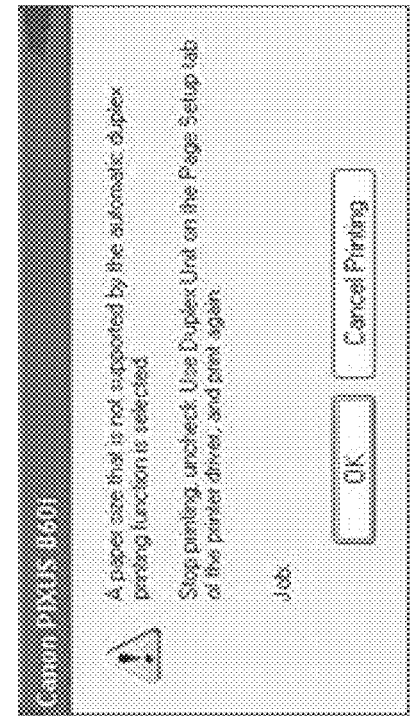
Figure 21:
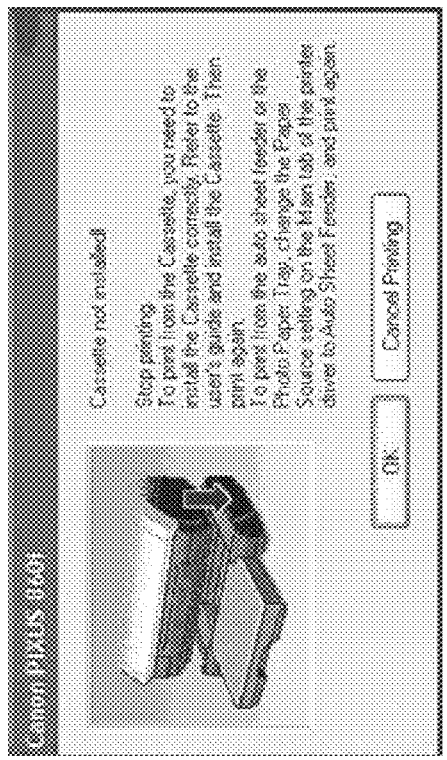
FIG. 21 is an example (U-Turn) Cassette printing warning dialog box.
Figure 20:
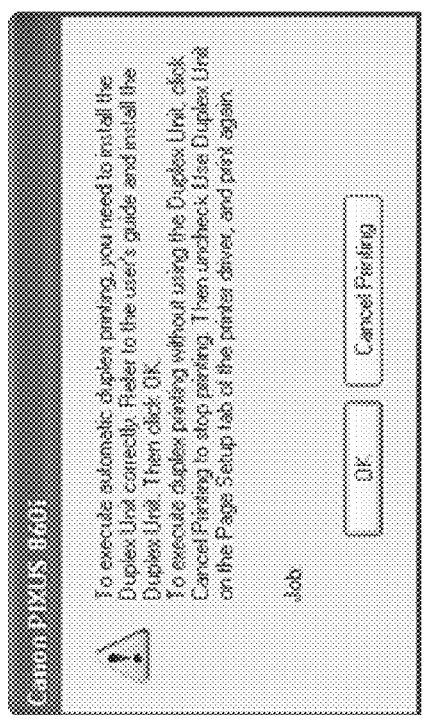
FIG. 20 is an example automatic duplex printing (Duplex Unit) warning dialog box.
Figure 22:
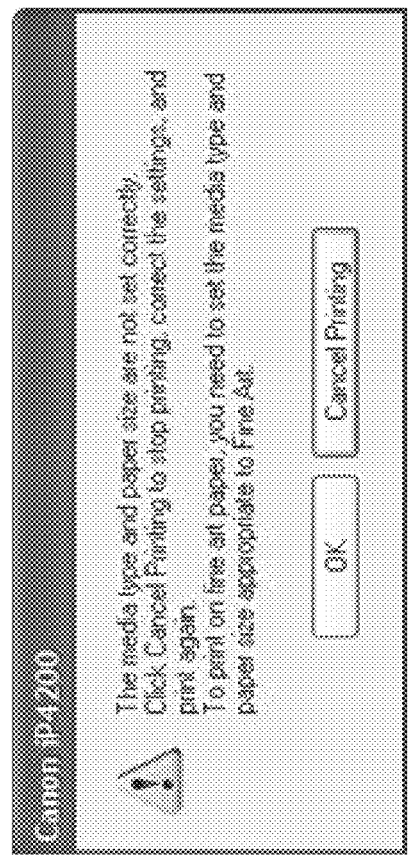
FIG. 22 is an example mismatch between media type and paper size warning.

FIGS. 8A-8D are example status monitor dialog boxes regarding mismatched cartridge or print head warnings. FIGS. 9A and 9B are example status monitor dialog boxes for the operation transition of ink tank replacing. FIG. 10 is an example cassette paper size mismatch warning dialog box. FIG. 11 is an example Auto Sheet Feeder installation error warning dialog box. FIG. 12 is an example paper source setting warning dialog box. FIGS. 13A and 13B are example paper thickness lever adjustment error dialog boxes. FIG. 14 is an example ink tank installation mismatch warning dialog box. FIG. 15 is an example media type mismatch warning dialog box. FIG. 16 is an example borderless printing unsupported media type warning dialog box. FIG. 17 is an example duplex printing unsupported media type warning dialog box. FIGS. 18A and 18B are example media size mismatch warning dialog boxes. FIGS. 19A and 19B are example unsupported paper size warning dialog boxes. FIG. 20 is an example automatic duplex printing (Duplex Unit) warning dialog box. FIG. 21 is an example (U-Turn) Cassette printing warning dialog box. FIG. 22 is an example mismatch between media type and paper size warning.

Another type includes guiding dialog boxes, for example to guide the user in manual feeding, banner print setting, manual duplex printing, printable disc printing, Choukei 3, 4 envelope printing, printing using composite black and head position alignment. The steps of the process may be divided into one or more dialog boxes such that the user's response triggers a next step of the process.

Figure 23A:
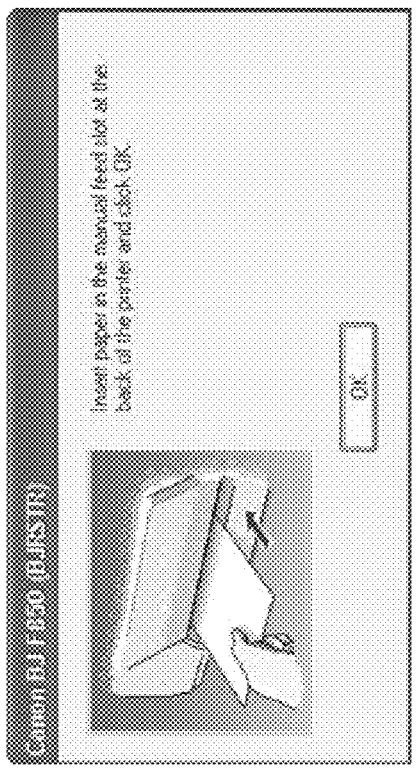
FIGS. 23A and 23B are example manual feeding guide dialog boxes.
Figure 23B:
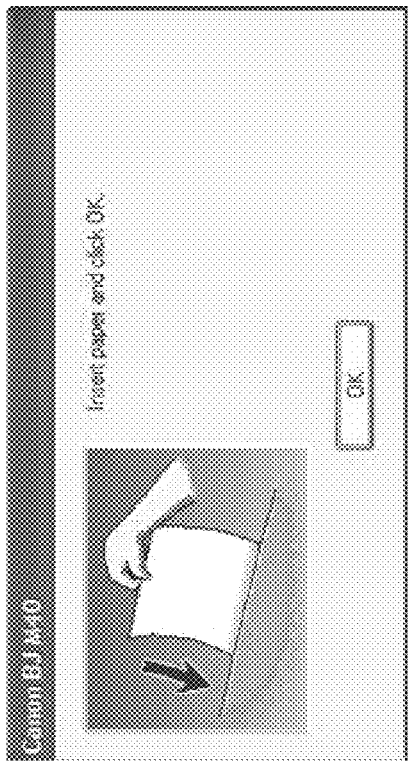
Figure 24A:
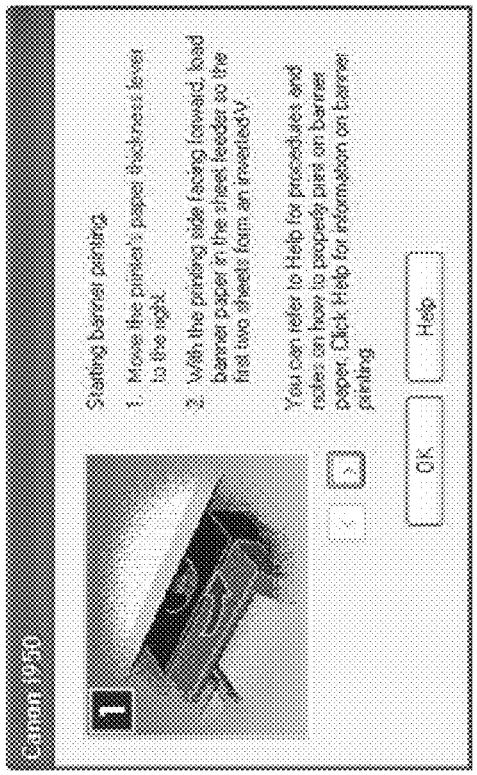
FIGS. 24A and 24B are example manual duplex printing guide dialog boxes.
Figure 24B:
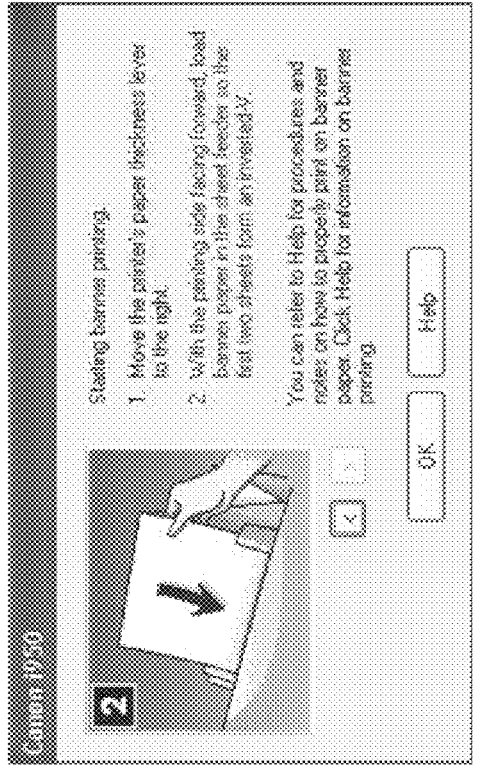
Figure 26B:
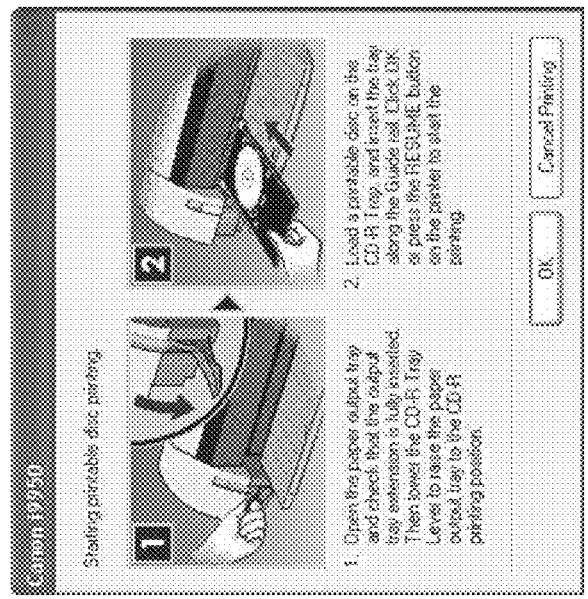
Figure 25A:
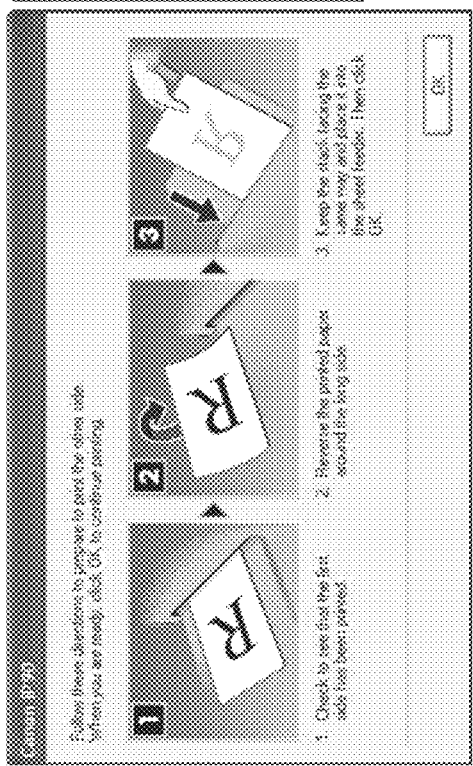
FIGS. 25A and 25B are example CD-R printing guide dialog boxes.
Figure 25B:
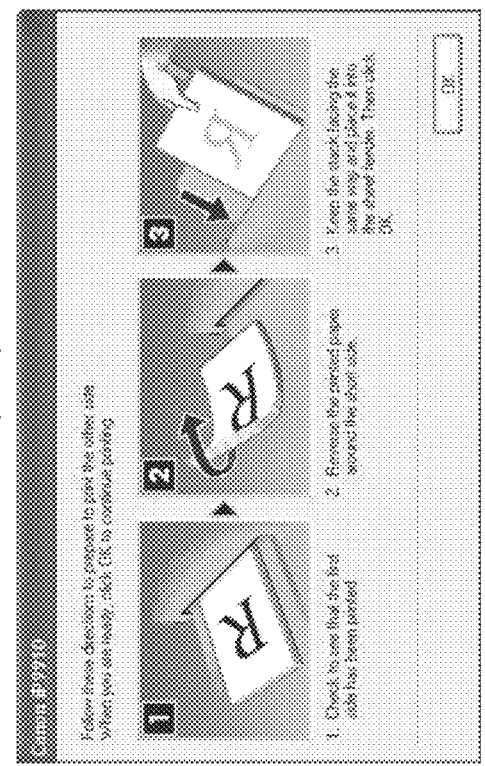
Figure 27B:
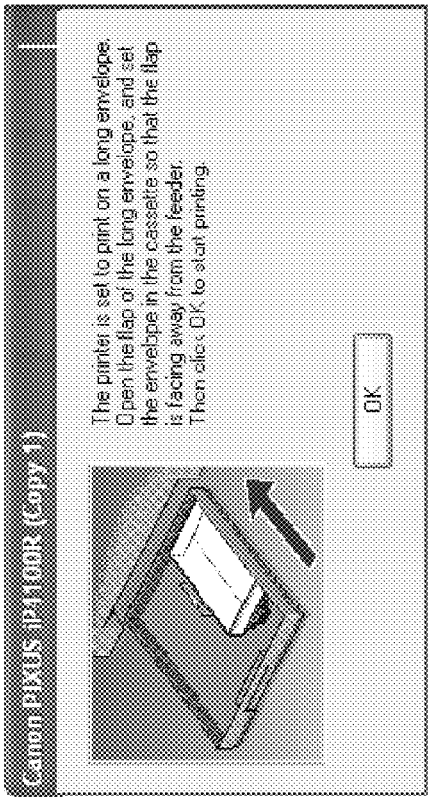
FIGS. 27A and 27B are example envelope printing print setting guide dialog boxes.
Figure 27A:
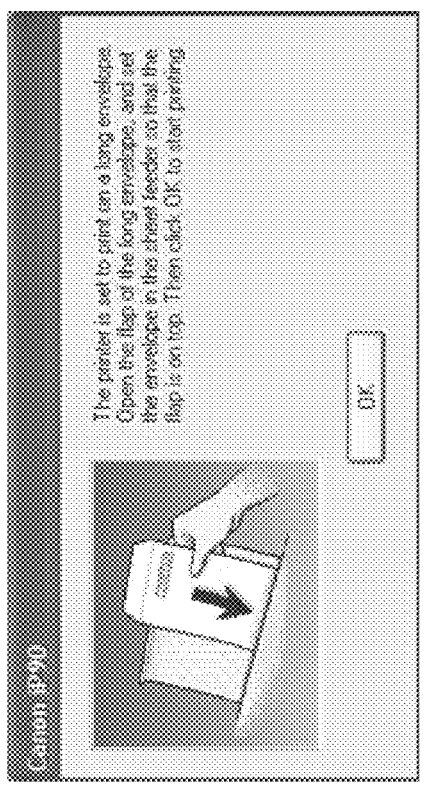
Figure 29:
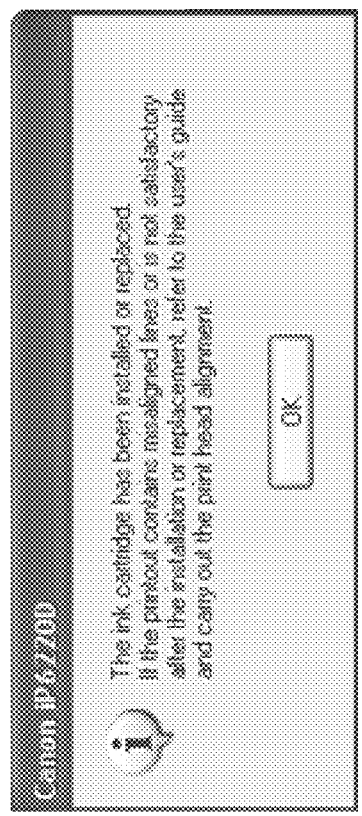
FIG. 29 is an example head position alignment guide dialog box.
Figure 28:
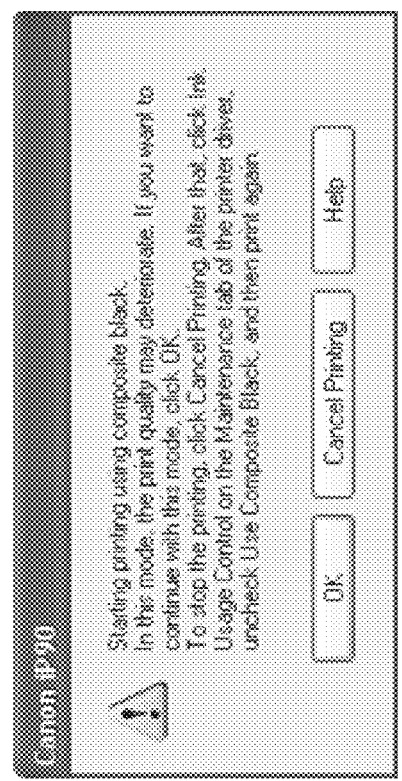
FIG. 28 is an example printing guide dialog box for "use composite black" mode.

FIGS. 23A and 23B are example manual feeding guide dialog boxes. FIGS. 24A and 24B are example manual duplex printing guide dialog boxes. FIGS. 25A and 25B are example CD-R printing guide dialog boxes. FIGS. 26A and 26B are example banner print setting guide dialog boxes. FIGS. 27A and 27B are example envelope printing print setting guide dialog boxes. FIG. 28 is an example printing guide dialog box for "use composite black" mode. FIG. 29 is an example head position alignment guide dialog box.

Yet another type of dialog boxes includes error dialog boxes. These may be related to material levels, such as ink has run out, a warning that the battery level will become low, a warning that the battery is low, paper is out, the printer's cover is open, the cartridge is at a replacement position, the ink tank is at a replacement position, there is jammed paper that needs to be removed, the waste ink is almost full, an ink tank is not installed, an ink tank is not installed properly, an unsupported device is connected, a print head is not installed, an intermediate guide necessary for printing (for example a CD-R Tray for printing on printable discs), a printable disc is not present in the CD-R tray, etc.

Figure 31:
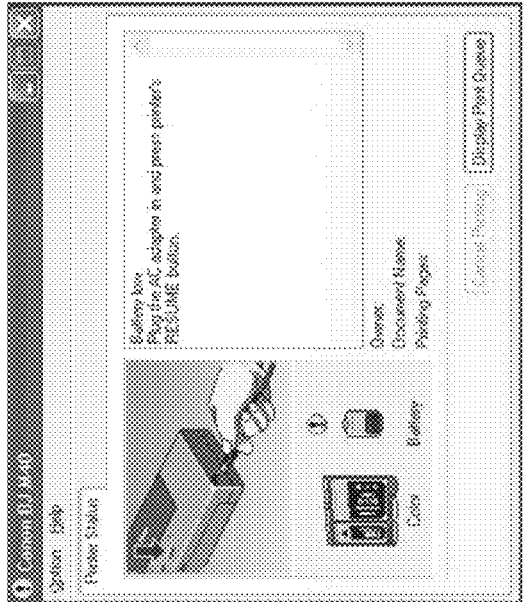
FIG. 31 is an example battery low warning error dialog box.
Figure 30:
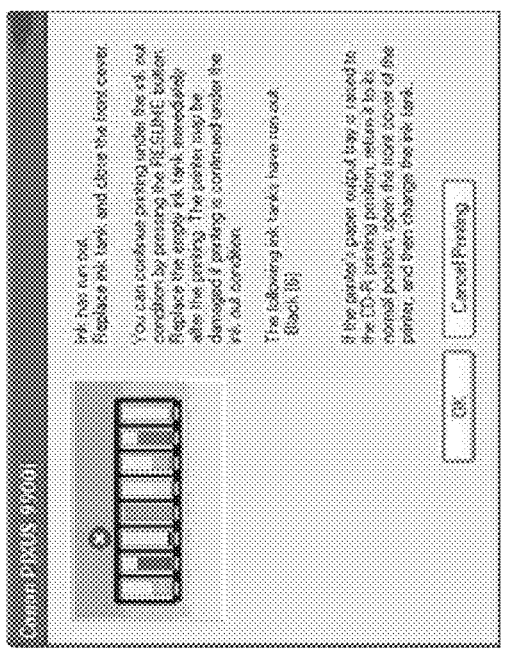
FIG. 30 is an example no ink error dialog box.
Figure 32B:
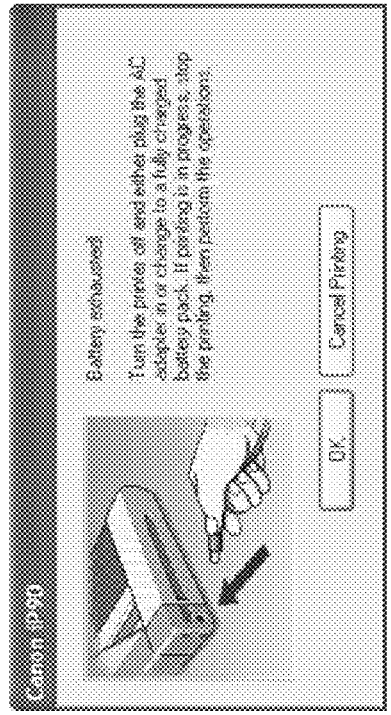
FIGS. 32A and 32B are example battery exhausted error dialog boxes.
Figure 32A:
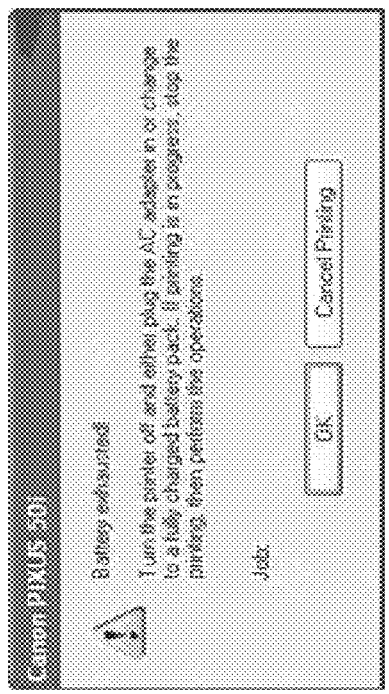
Figure 34:
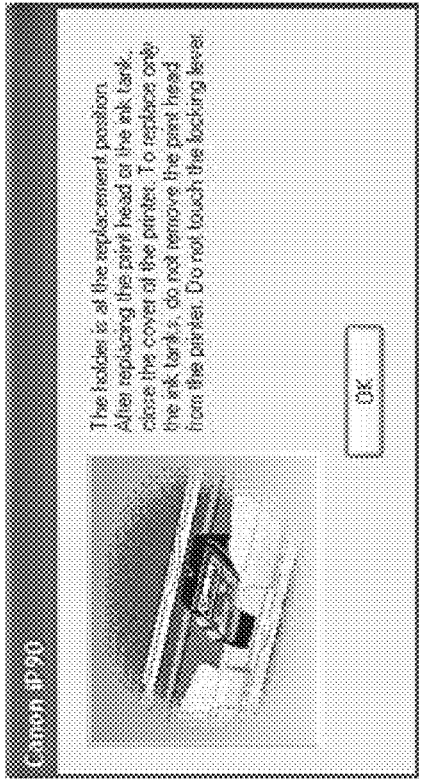
FIG. 34 is an example printer cover open while printing error dialog box.
Figure 35A:
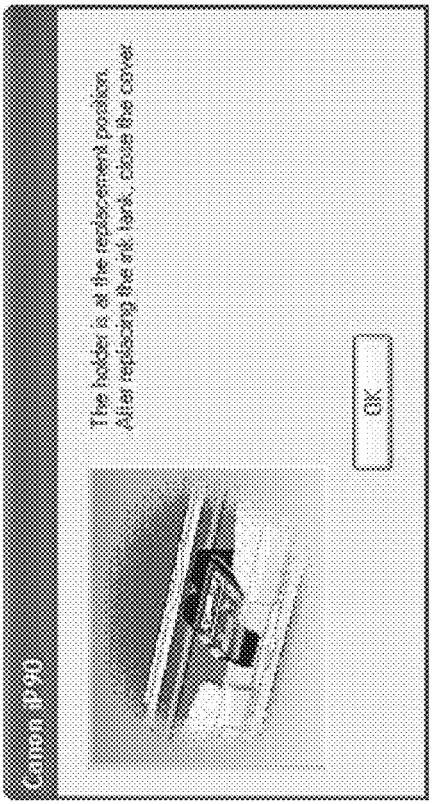
FIGS. 35A and 35B are example cartridge is being replaced error dialog boxes.
Figure 35B:
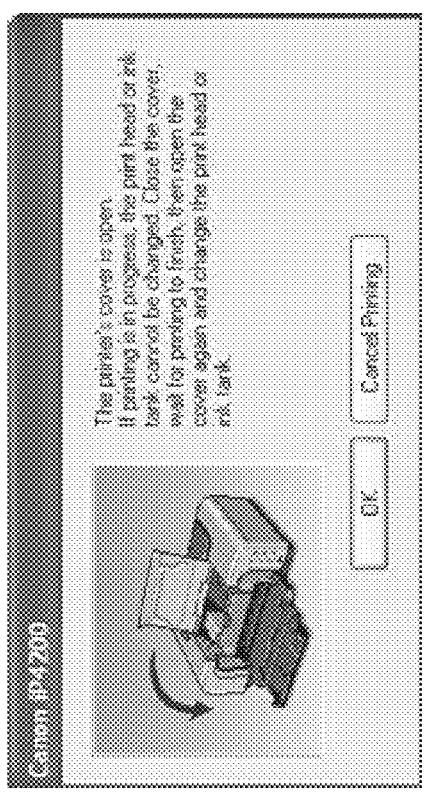
Figure 36:
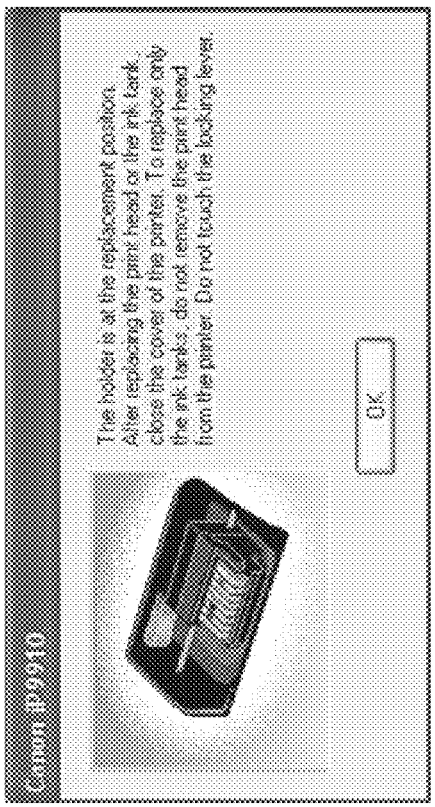
FIG. 36 is an example ink tank is being replaced error dialog box.
Figure 39:
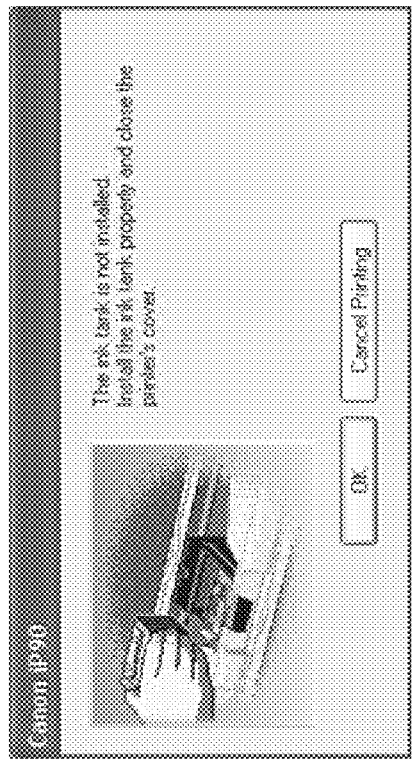
FIG. 39 is an example ink tank uninstalled error dialog box.
Figure 37B:
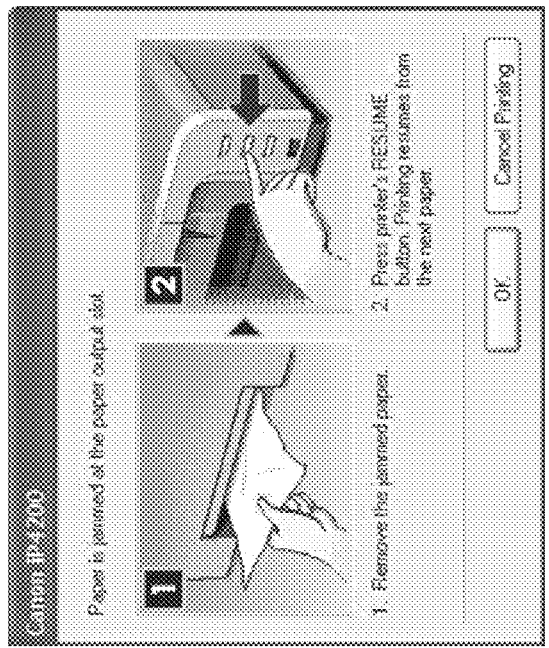
FIGS. 37A and 37B are example paper jam error dialog boxes.
Figure 37A:
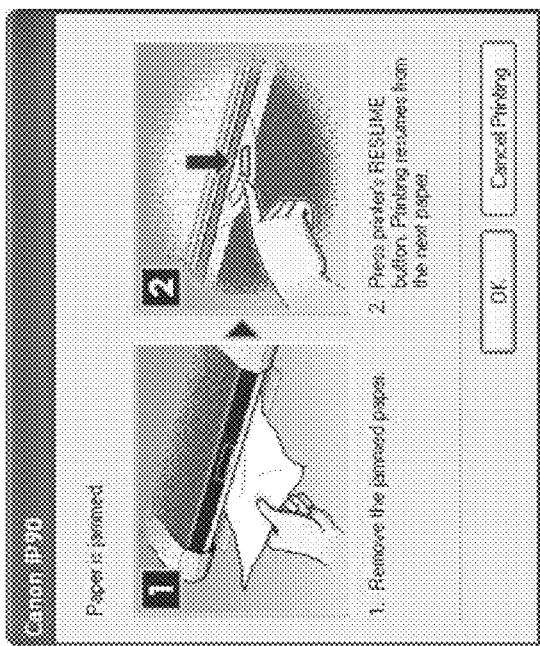
Figure 38:
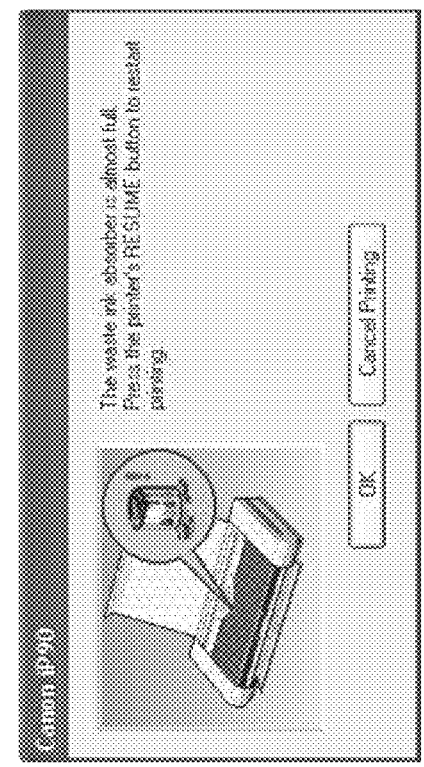
FIG. 38 is an example waste ink tank full error dialog box.
Figure 40A:
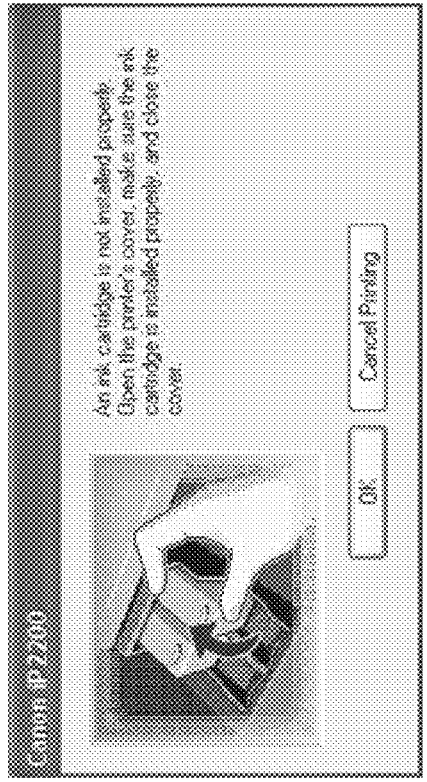
FIGS. 40A and 40B are example ink tank improper installation error dialog boxes.
Figure 40B:
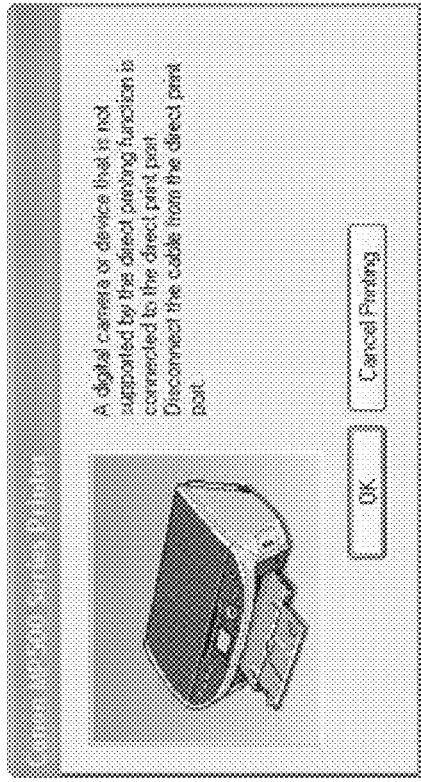
Figure 41A:
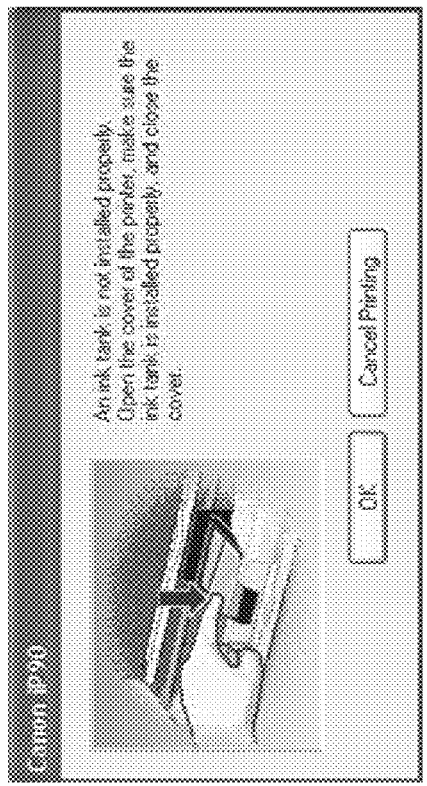
FIGS. 41A and 41B are example unsupported device connected error dialog boxes.
Figure 41B:
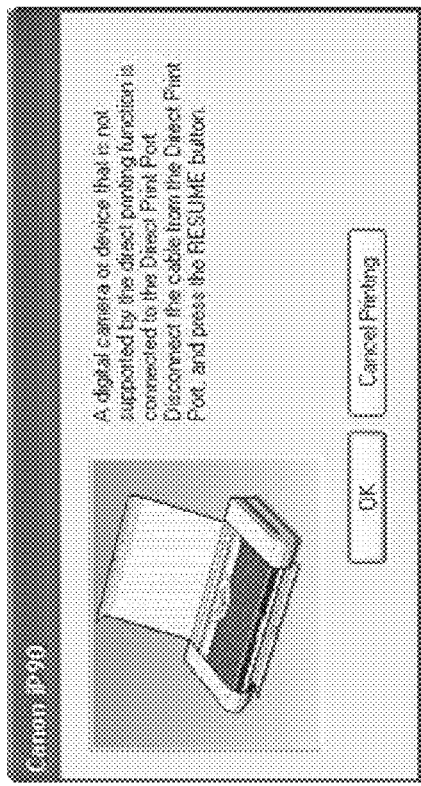
Figure 44A:
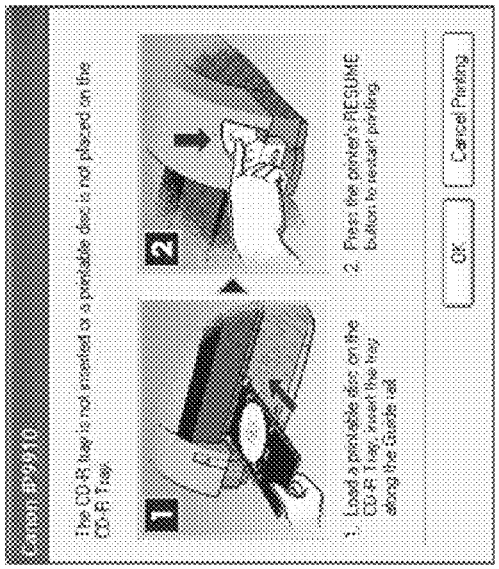
FIGS. 44A and 44B are example CD-R printing error (disc media) dialog boxes.
Figure 44B:
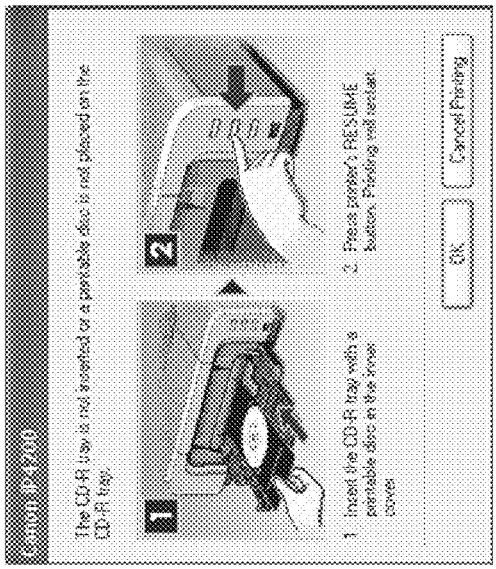
Figure 43A:
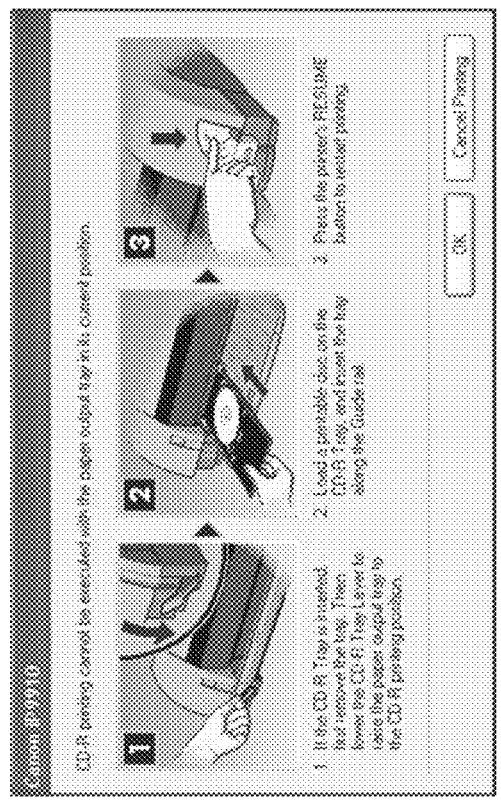
FIGS. 43A and 43B are example CD-R printing error (CD-R Tray guide) dialog boxes.
Figure 43B:
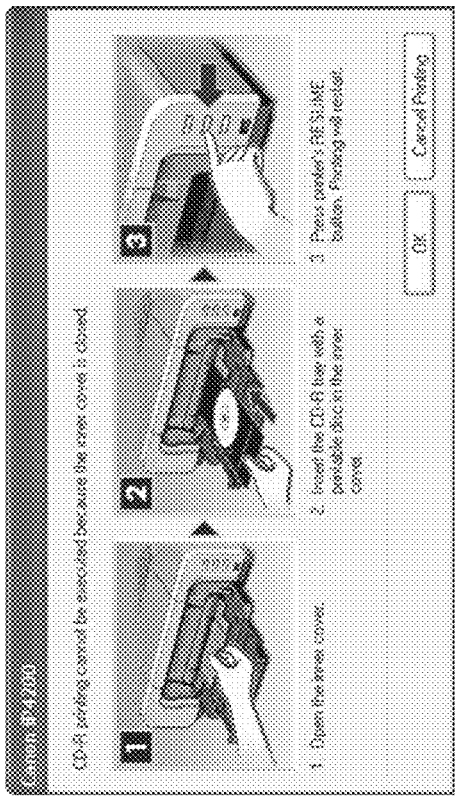
Figure 45A:
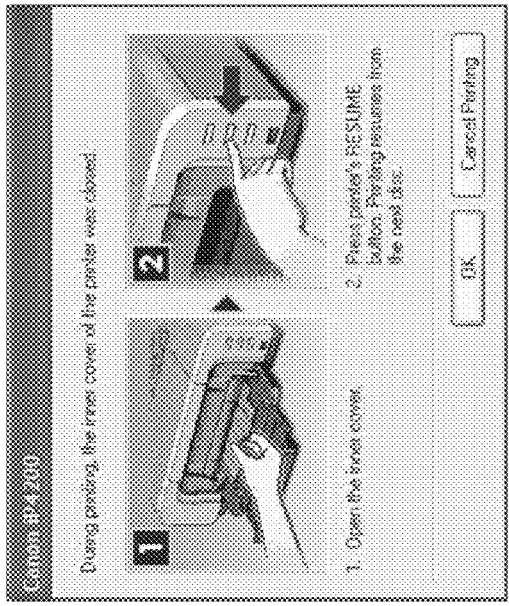
FIGS. 45A and 45B are example CD-R printing error (tray or cover position) dialog boxes.
Figure 46A:
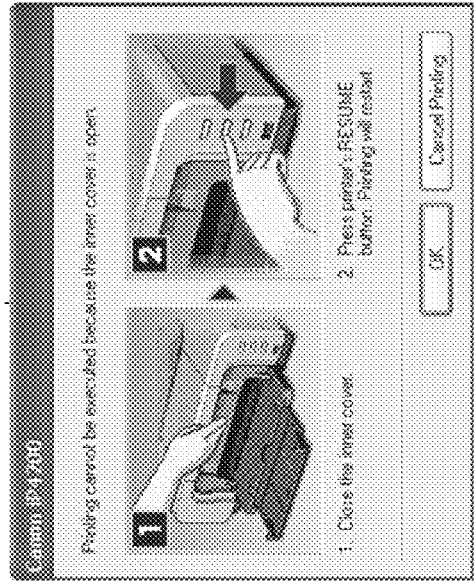
FIGS. 46A and 46B are example printing error (paper output tray or cover position) dialog boxes.
Figure 45B:
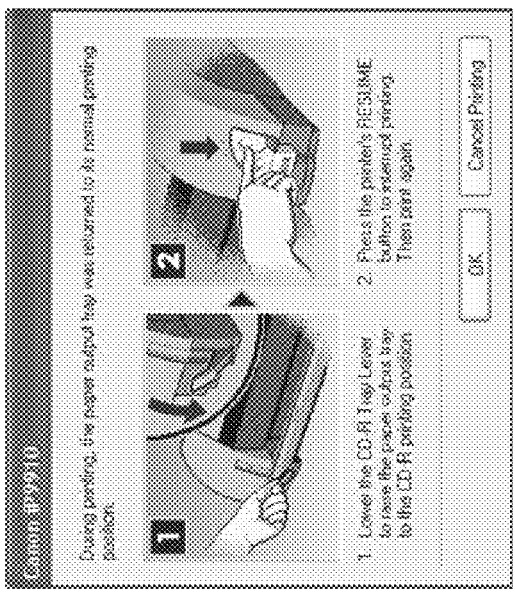
Figure 46B:
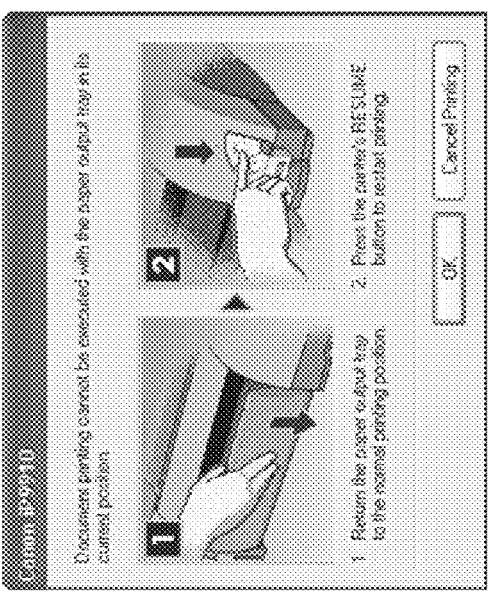
Figure 47A:
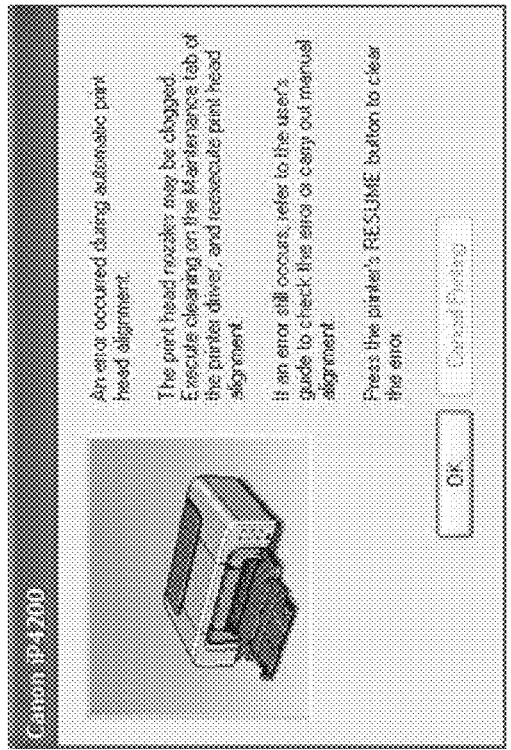
FIGS. 47A and 47B are example automatic print head alignment error dialog boxes.
Figure 47B:
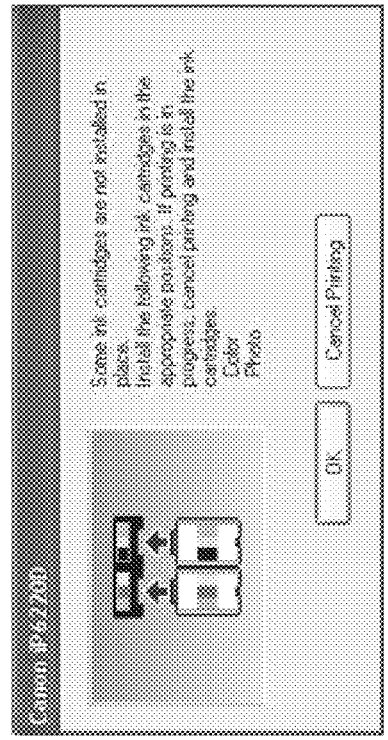
Figure 48:
FIG. 48 is an example ink tank installation error dialog box.
Figure 49:
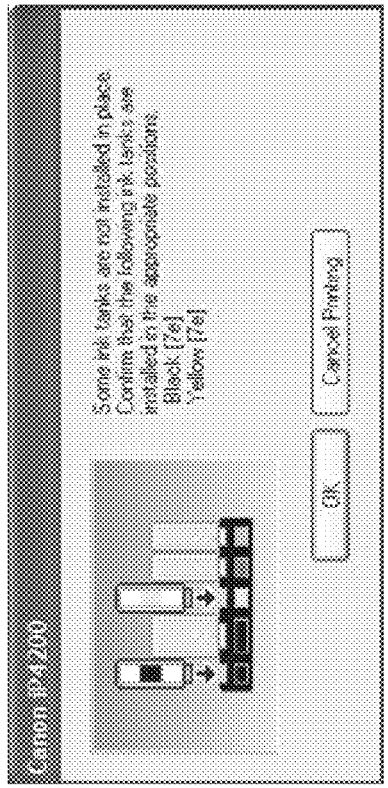
FIG. 49 is an example ink cartridge installation error dialog box.
Figure 50:
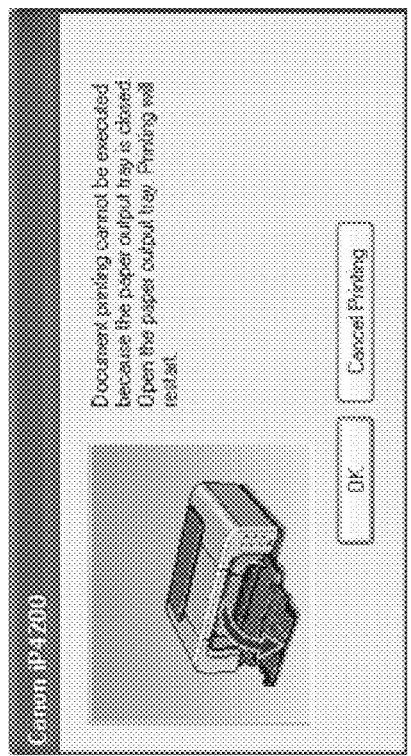
FIG. 50 is an example document printing (paper output tray open) dialog box.
Figure 51:
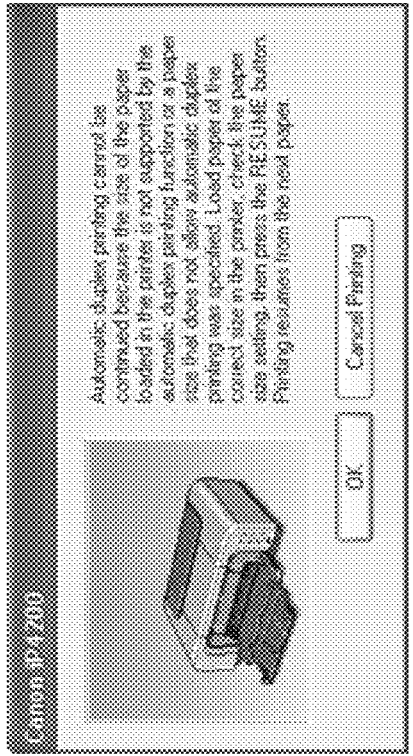
FIG. 51 is an example automatic duplex printing error dialog box.
Figure 42:
FIG. 42 is an example print head installation error dialog box.

FIG. 30 is an example no ink error dialog box. FIG. 31 is an example battery low warning error dialog box. FIGS. 32A and 32B are example battery exhausted error dialog boxes. FIGS. 33A-D are example paper out error dialog boxes. FIG. 34 is an example printer cover open while printing error dialog box. FIGS. 35A and 35B are example cartridge is being replaced error dialog boxes. FIG. 36 is an example ink tank is being replaced error dialog box. FIGS. 37A and 37B are example paper jam error dialog boxes. FIG. 38 is an example waste ink tank full error dialog box. FIG. 39 is an example ink tank uninstalled error dialog box. FIGS. 40A and 40B are example ink tank improper installation error dialog boxes. FIGS. 41A and 41B are example unsupported device connected error dialog boxes. FIG. 42 is an example print head installation error dialog box. FIGS. 43A and 43B are example CD-R printing error (CD-R Tray guide) dialog boxes. FIGS. 44A and 44B are example CD-R printing error (disc media) dialog boxes. FIGS. 45A and 45B are example CD-R printing error (tray or cover position) dialog boxes. FIGS. 46A and 46B are example printing error (paper output tray or cover position) dialog boxes. FIGS. 47A and 47B are example automatic print head alignment error dialog boxes. FIG. 48 is an example ink tank installation error dialog box. FIG. 49 is an example ink cartridge installation error dialog box. FIG. 50 is an example document printing (paper output tray open) dialog box. FIG. 51 is an example automatic duplex printing error dialog box.

The dialog boxes and user interfaces depicted and described are non-limiting examples of status monitor displays that can be provided through the distributed network printing systems and methods described herein. With respect to additional notifications or status, information such as ink details (for example "(Cyan) Ink is running low"), battery information for a portable printer (such as "Battery is low" or empty), job information (such as "printing page", etc.), cartridge mismatch warning (for example in the instance that a color photo is attempted to be printed to a monochrome printer), cassette information (for example in the instance that a 4×6 photo is attempted to be printed to a printer whose default bin is 8×10), media type mismatch when a user tries to print a photo but the printer has plain paper, etc. may also be provided. There are many status(es) and information that can be reported depending on the printer's specific features.

The instant subject matter may also be implemented in a scenario when the print request corresponds to for example, ten pages, but the target printer has only five sheets of paper remaining in the supply tray. The print job will stop at the end of printing the five available sheets (pages). With the status monitor described herein enabled, the distributed network printing server will be notified (by the cloud-aware printer or proxy device) of this situation and the server can allow the mobile or application user to select another printer to print the rest of the document (if re-filling the supply tray is not an available or ready option). It would also be possible then for either the proxy device or the distributed network printer server to modify the print job for the second selected target printer to contain only the pages remaining (of the print job, that is the sixth to tenth pages only). Thus, the instant subject matter may also be used to cancel, modify, reroute or redirect print jobs or print settings when other resolution is not possible or readily available.

The above described devices, systems, and methods can be achieved by supplying one or more storage media having stored thereon computer-executable instructions for realizing the above described operations to one or more computing devices (e.g., CPU, MPU) that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk, a hard disk), an optical disc (including a CD, a CD-ROM, a CD-R, a DVD, a DVD-R, a Blu-ray disc and their variants), a magneto-optical disk, a magnetic tape, and a solid state memory (including flash memory, DRAM, SRAM, a solid state drive) or non-volatile memory card and a ROM) can be employed as a storage medium for the computer-executable instructions.

The computer-executable instructions may be written to a computer-readable storage medium provided on a function-extension board inserted into the device or on a function-extension unit connected to the device, and a CPU provided on the function-extension board or unit may implement the operations of the above-described embodiments. When the computer-executable instructions are executed by the one or more computing devices, not only are the above described operations of the embodiments realized, but also an operating system working on the computing system may carry out part or all of the actual processing that realizes the operations of the above described embodiments.

While the above disclosure describes certain illustrative embodiments in particular, it is to be understood that the subject matter of this application and scope of the appended claims is not limited to the above-described embodiments and that various changes, equivalent arrangements and modifications may be made without departing from the scope and spirit of the claims.

What is claimed is:

1. A printing system, the printing system comprising:
an application configured to initiate a printing request;
a print server configured to embed status monitor instructions in print data of a print job corresponding to the printing request to create combined print data; and
a printer configured to receive the combined print data from the print server, decipher the combined print data, extract the status monitor instructions from the combined print data, and process the print data,
wherein, during printing, the printer follows the status monitor instructions to query a printer status from a printer port and forwards the printer status to the print server, and
wherein, upon receipt of the printer status, the print server sends a message corresponding to the printer status for display to a user.

2. The system of claim 1, wherein at least one command of the status monitor instructions is selected from the group consisting of: show a message after sending data, wait for user confirmation, pause sending data, read data periodically while printing and send the data to the print server, read data from a device after the data up to this point is sent to the device, wait for user selection and send the user selection to the print server, read data from a device after the data up to this point is sent to the device and wait for instruction from the print server, and commands related to manual duplex printing.

3. The system of claim 1, wherein the printer status is coded, and the print server checks with a database of the printer to decipher whether the coded printer status is an error or warning, find a corresponding error or warning string, and determine potential solutions to the error or warning.

4. The system of claim 1,
wherein the printer status includes an error or warning,
wherein the print server is further configured to initiate display of a prompt that allows the user to select from options to resolve the error or warning, and
wherein, upon receipt of a user selection of an option to resolve the error or warning, the print server and the printer communicate to resolve the error or warning.

5. The system of claim 4, wherein the printer sends the user selection to the print server, the print server matches the user selection to a print command from a database for the printer, and the print server sends the print command to the printer for action.

6. The system of claim 5, wherein the action is selected from the group consisting of: removing the print job from a print queue, sending a soft reset to the printer to stop printing, ejecting the printer paper, resuming printing, and resuming duplex printing.

7. The system of claim 1, wherein embedding the status monitor instructions is performed in consideration of the printer.

8. The system of claim 1, wherein the print server stores driver information and knowledge of the printer.

9. A printing system, the printing system comprising:
an application configured to initiate a printing request;
a print server configured to embed status monitor instructions in print data of a print job corresponding to the printing request to create combined print data;
a proxy configured to receive the combined print data from the print server, decipher the combined print data, and extract the status monitor instructions from the combined print data; and
a printer connected to a thin-client running the proxy and configured to receive the print data from the proxy,
wherein, during printing, the proxy follows the status monitor instructions to query a printer status from a printer port and forwards the printer status to the print server, and
wherein, upon receipt of the printer status, the print server sends a message corresponding to the printer status for display to a user.

10. The system of claim 9, wherein at least one command of the status monitor instructions is selected from the group consisting of: show a message after sending data, wait for user confirmation, pause sending data, read data periodically while printing and send the data to the print server, read data from a device after the data up to this point is sent to the device, wait for user selection and send the user selection to the print server, read data from a device after the data up to this point is sent to the device and wait for instruction from the print server, and commands related to manual duplex printing.

11. The system of claim 9, wherein the proxy removes the status monitor instructions from the print data before passing the print data to the printer.

12. The system of claim 9, wherein the embedded status monitor instructions are ignored by the printer.

13. The system of claim 9, wherein the printer status is coded, and the print server is configured to check with a database of the printer to decipher whether the coded printer status is an error or warning, to find a corresponding error or warning string, and to determine potential solutions to the error or warning.

14. The system of claim 9,
wherein the printer status includes an error or warning,
wherein the print server is further configured to initiate display of a prompt that allows the user to select from options to resolve the error or warning, and
wherein, upon receipt of a user selection of an option to resolve the error or warning, the proxy communicates with the print server and the printer to resolve the error or warning.

15. The system of claim 14, wherein the proxy sends the user selection to the print server, the print server matches the user selection to a print command from a database for the printer, the print server sends the print command to the proxy, and the proxy passes the print command to the printer for action.

16. The system of claim 15, wherein the action is selected from the group consisting of: removing the print job from a print queue, sending a soft reset to the printer to stop printing, ejecting the printer paper, resuming printing, and resuming duplex printing.

17. The system of claim 9, wherein embedding the status monitor instructions is performed in consideration of the printer.

18. The system of claim 9, wherein the print server comprises driver information and knowledge of the printer and the thin-client/proxy comprises no driver information or driver knowledge of the printer.

19. A printing method, the method comprising:
receiving a printing request at a print server;
at the print server, embedding status monitor instructions in print data of a print job corresponding to the printing request to create combined print data;
at a printer, receiving the combined print data, deciphering the combined print data, extracting the status monitor instructions from the combined print data, and processing the print data;
during printing, following the status monitor instructions to query a printer status from a printer port and forwarding the printer status to the print server; and
upon receipt of the printer status at the print server, sending a message corresponding to the printer status for display to a user.

* * * * *